US011613603B2

(12) United States Patent
Hearon et al.

(10) Patent No.: US 11,613,603 B2
(45) Date of Patent: *Mar. 28, 2023

(54) PROCESSABLE, TUNABLE THIOL-ENE CROSSLINKED POLYURETHANE SHAPE MEMORY POLYMERS

(71) Applicants: LAWRENCE LIVERMORE NATIONAL SECURITY, LLC, Livermore, CA (US); The Texas A&M University System, College Station, TX (US)

(72) Inventors: Keith Hearon, College Station, TX (US); Landon D. Nash, College Station, TX (US); Thomas Wilson, Livermore, CA (US); Duncan J. Maitland, College Station, TX (US); Mark A. Wierzbicki, College Station, TX (US)

(73) Assignees: Lawrence Livermore National Security, LLC, Livermore, CA (US); The Texas A&M University System, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/924,819

(22) Filed: Jul. 9, 2020

(65) Prior Publication Data
US 2020/0339730 A1 Oct. 29, 2020

Related U.S. Application Data

(63) Continuation of application No. 15/548,212, filed as application No. PCT/US2016/016167 on Feb. 2, 2016, now Pat. No. 10,730,991.

(60) Provisional application No. 62/144,819, filed on Apr. 8, 2015, provisional application No. 62/111,233, filed on Feb. 3, 2015.

(51) Int. Cl.
| C08G 18/32 | (2006.01) |
| C08G 18/67 | (2006.01) |
| C08G 18/75 | (2006.01) |
| C08L 81/02 | (2006.01) |
| C08L 75/16 | (2006.01) |
| C08L 75/04 | (2006.01) |
| C08G 18/73 | (2006.01) |
| B29K 105/04 | (2006.01) |

(52) U.S. Cl.
CPC ..... *C08G 18/3206* (2013.01); *C08G 18/3212* (2013.01); *C08G 18/675* (2013.01); *C08G 18/6715* (2013.01); *C08G 18/73* (2013.01); *C08G 18/758* (2013.01); *C08L 75/04* (2013.01); *C08L 75/16* (2013.01); *C08L 81/02* (2013.01); *B29K 2105/04* (2013.01)

(58) Field of Classification Search
CPC ............ B29K 2105/04; C08G 18/3206; C08G 18/3212; C08G 18/6715; C08G 18/675; C08G 18/73; C08G 18/758; C08J 5/00; C08K 5/37; C08L 75/04; C08L 75/16; C08L 81/02

See application file for complete search history.

(56) References Cited

U.S. PATENT DOCUMENTS

| 4,335,231 A | 6/1982 | Singh |
| 8,883,871 B2 | 11/2014 | Wilson et al. |
| 10,730,991 B2* | 8/2020 | Hearon ............... C08G 18/3206 |
| 2010/0311861 A1 | 12/2010 | Clapper et al. |
| 2011/0144227 A1 | 6/2011 | Bowman et al. |
| 2011/0275726 A1 | 11/2011 | Wilson et al. |
| 2014/0092360 A1 | 4/2014 | Zheng |

FOREIGN PATENT DOCUMENTS

| CN | 102803320 A | 11/2012 |
| CN | 103358483 A | 10/2013 |
| EP | 0062995 A1 | 10/1982 |
| JP | H3-7717 A | 1/1991 |
| JP | H0431415 A | 2/1992 |

OTHER PUBLICATIONS

Beigi et al., "Evaluation of Fracture Toughness and Mechanical Properties of Thernary Thiol-ene-methacrylate Systems as Resin Matrix for Dental Restorative Composites," Dent. Mater, 2013, 29, pp. 777-787.
Buckley et al., "Novel Triol-Crosslinked Polyurethanes and Their Thermorheological Characterization as Shape-Memory Materials," Polymer, 2007, 48, pp. 1388-1396.
Harkal et al., "UV Curable Glycidyl Carbamate Based Resins," Prog. Org. Coat., 2012, 73, pp. 19-25.
Hearon et al., "A Structural Approach to Establishing a Platform Chemistry for the Tunable, Bulk Electron Beam Cross-Linking of Shape Memory Polymer Systems," Macromolecules, 2013, 10.1021, pp. 8905-1916.
Hearon et al., "Porous Shape Memory Polymers," Polym. Rev., 2013, 53, pp. 41-75.
Hearon et al., "Post-Polymerization Crosslinked Polyurethane Shape Memory Polymers," J. of Appl. Polym. Sci., 2011, 121, pp. 144-153.
Hearon et al., "The Effect of Free Radical Inhibitor on the Sensitized Radiation Crosslinking and Thermal Processing Stabilization of Polyurethane Shape Memory Polymers," Radiat. Phys. Chem., 2013, 83, pp. 111-121.

(Continued)

Primary Examiner — John M Cooney
(74) Attorney, Agent, or Firm — Trop, Pruner & Hu, P.C.

(57) ABSTRACT

An embodiment includes a platform shape memory polymer system. Such an embodiment exhibits a blend of tunable, high performance mechanical attributes in combination with advanced processing capabilities and good biocompatibility. A post-polymerization crosslinking synthetic approach is employed that combines polyurethane and thiol-ene synthetic processes. Other embodiments are described herein.

20 Claims, 17 Drawing Sheets

(56) References Cited

OTHER PUBLICATIONS

Hoyle et al., "Thiol-Click Chemistry: A Multifaceted Toolbox for Small Molecule and Polymer Synthesis," Chem. Soc. Rev., 2010, 39, pp. 1355-1387.
Hoyle et al., "Thiol-Ene Click Chemistry," Agnew. Chem. Int. Ed., 2010, 49, pp. 1540-1573.
International Search Report and Written Opinion for PCT/US2016/016167, dated Jun. 14, 2016, 11 pp.
Julich-Gruner et al., "Recent Trends in the Chemistry of Shape-Memory Polymers," Macromol. Chem. Phys., 2013, 214, pp. 527-536.
Kasprzak et al., Synthesis and Thermomechanical Behavior of (qua)ternary Thiol-ene(/acrylate) Copolymers, Polymer, 2009, 50, pp. 5549-5558.
Lendlein et al., "Shape Memory Polymers," Agnew. Chem. Int. Ed., 2002, 41, pp. 2034-2057.
Li et al., "Comparison of Small Molecule and Polymeric Urethanes, Thiourenthanes, and Dithiourethanes: Hydrogen Bonding and Thermal, Physical, and Mechanical Properties," Macromolecules, 2009, 43, pp. 1824-1833.
Liu et al., Review of Progress in Shape-Memory Polymers, J. Mater. Chem., 2007, 17, 1543-1558.
Maitland et al., "Photothermal Properties of Shape Memory Polymer Micro-Actuators for Treating Stroke," Laser Surg. Med., 2002, 30, pp. 1-11.
Nair et al., "Photopolymerized Thiol-ene Systems as Shape Memory Polymers," Polymer, 2010, 51, pp. 4383-4389.
Nash et al., "Design and Characterization of a Resistively Heated Shape Memory Polymer Micro-Release Device," J. Med. Devices, 2014, 8, pp. 020911-1-020911-2.
Otts et al., "Novel Waterborne UV-Crosslinkable Thiol-ene Polyurethane Dispersions: Synthesis and Film Formation," Polymer, 2005, 46, pp. 8162-8168.
Rodriguez et al., "In Vivo Response to an Implanted Shape Memory Polyurethane Foam in a Procine Aneurysm Model," J. Biomed, Mater. Res., Part A, 2013, pp. 1231-1242.
Safranski et al., "Effect of Chemical Structure and Crosslinking Density on the Thermo-Mechanical Properties and Toughness of (Meth)arcrylate Shape Memory Polymer Networks," Polym., 2008, 49, pp. 4446-4455.
Safranski et al., "Mechanical Requirements of Shape-Memory Polymers in Biomedical Devices," Polym. Rev., 2013, 53, pp. 76-91.
Small et al., "Biomedical Applications of Thermally Activated Shape Memory Polymers," J. Mater. Chem., 2010, 20, pp. 3356-3366.
Ware, et al., "Three-Dimensional Flexible Electronics Enabled by Shape Memory Polymer Substrates for Responsive Neural Interfaces," Macromol. Mater. Eng., 2012, 297, pp. 1193-1202.
Wilson et al., "Shape Memory Polymers Based on Uniform Aliphatic Urethane Networks," J. Appl. Polym. Sci., 2007, 106, pp. 540-551.
Yakacki et al., "Shape-Memory Polymers for Biomedical Applications," Adv. Polym. Sci., 2010, 226, pp. 147-175.
Yang et al., "Newly UV-Curable Polyurethane Coatings Prepared by Multifunctional Thiol-and Ene-Terminated Polyurethane Aqueous Dispersions Mixtures: Preparation and Characterization," Polymer, 2009, 50, pp. 1717-1722.
PCI Paint & Coatings Industry, "Crosslinking Technology for Fast-Curing, High-Performance, Low-VOC Coatings," Oct. 1, 2001, 7 pages total.
PCI Paint & Coatings Industry, "EB Curing: The EB Advantage," Apr. 1, 2008, 5 pages total.
ESI (Energy Sciences, Incorporated), "EB Vs. UV Penetration—EB Curable Technology,Electron Beam Technology, Electron Beam Advantages," Feb. 15, 2016, 2 pages total.
Keith Hearon, et al., "The Effect of Free Radical Inhibitor on the Sensitized Radiation Crosslinking and Thermal Processing Stabilization of Polyurethane Shape Memory Polymers," Radiation Physics and Chemistry, Oct. 31, 2012, 26 pages total.
European Patent Office, Supplementary European Search Report dated Jul. 16, 2018 in European patent application No. 16747112.7, seven pages.
Chinese Pattnt Office, Office Action dated Dec. 19, 2019 io Chinese patent application No. 201680012601.1, seven pages.
Japanese Patent Office, Office Action dated Jan. 21, 2020 in Japanese patent application No. 2017-540646, 10 pages total.
European Patent Office, Office Action dated Apr. 14, 2021 in European Patent Application No. 16747112.7 (4 pages).
Chinese Patent Office, Chinese Office Action dated Dec. 8, 2020 in Chinese application No. 201680012601.1, 6 pages total.
Japanese Patent Office, Office Action dated Mar. 5, 2021 in Japanese Patent Application No. 2017-540646 (3 pages).
Japanese Patent Office, Office Action dated May 17, 2022 in Japanese Patent Application No. 2017-540646 (5 pages).
Japanese Patent Office, Office Action dated Sep. 14, 2021 in Japanese Patent Application No. 2017-540646 (6 pages).
Japanese Patent Office, Decision for Patent dated Jan. 17, 2023 in Japanese Patent Application No. 2017-540646 (4 pages).

* cited by examiner

| | Varying TMPAE Series (Varying $E_r$) | Equiv. TMHDI | Equiv. TMPAE | Equiv. 3-MPD | Equiv. 2x AA | Mn | Mw | PDI |
|---|---|---|---|---|---|---|---|---|
| | TMPAE-0.05 | 1.020 | 0.05 | 0.950 | 0.010 | 15.0 | 26.9 | 1.79 |
| | TMPAE-0.1 | 1.020 | 0.100 | 0.900 | 0.010 | 17.2 | 30.7 | 1.79 |
| | TMPAE-0.3 | 1.020 | 0.300 | 0.700 | 0.010 | 1.9 | 5.2 | 2.78 |
| | TMPAE-0.5 | 1.020 | 0.500 | 0.500 | 0.010 | 1.3 | 3.7 | 2.81 |
| | TMPAE-0.7 | 1.020 | 0.700 | 0.300 | 0.010 | 1.1 | 3.5 | 3.01 |
| | TMPAE-0.9 | 1.020 | 0.900 | 0.100 | 0.010 | 2.8 | 9.5 | 2.69 |
| | Varying Diol Series (Varying $T_g$) | Equiv. TMHDI | Equiv. TMPAE | Equiv Diol | Equiv. 2x AA | Mn | Mw | PDI |
| | DEG-0.9 | 1.020 | 0.100 | 0.900 | 0.010 | 16.3 | 38.7 | 2.37 |
| | 1,4-BD-0.9 | 1.020 | 0.100 | 0.900 | 0.010 | 11.5 | 28.6 | 2.49 |
| | 2-MPD-0.9 | 1.020 | 0.100 | 0.900 | 0.010 | 18.7 | 57.3 | 3.06 |
| | 2,2-DMPD-0.9 | 1.020 | 0.100 | 0.900 | 0.010 | 17.0 | 41.4 | 2.44 |
| | CHDM-0.9 | 1.020 | 0.100 | 0.900 | 0.010 | 11.9 | 31.2 | 2.62 |
| | Varying DCHMDI Series (Varying $T_g$) | Equiv. DCHMDI | Equiv. HDI | Equiv TMPAE | Equiv. 2x AA | Mn | Mw | PDI |
| | DCHMDI-0.0 | 0.000 | 1.020 | 1.000 | 0.010 | 21.2 | 65.4 | 3.08 |
| | DCHMDI-0.1 | 0.100 | 0.920 | 1.000 | 0.010 | 10.0 | 20.6 | 2.06 |
| | DCHMDI-0.5 | 0.500 | 0.520 | 1.000 | 0.010 | 5.5 | 11.0 | 2.00 |
| | DCHMDI-1.0 | 1.000 | 0.020 | 1.000 | 0.010 | 5.4 | 9.7 | 1.80 |

Polythiol Crosslinking Agents:

EGBMP, TMPTMP, 3-TI, PETMP, DPEHMP

FIG. 3

| Series | Sample | Polythiol Crosslinker | %DMPA | %THF | Post Cure @ 120°C | Gel Fraction | Error |
|---|---|---|---|---|---|---|---|
| Varying TMPAE | TMPAE-0.1 | TMPTMP | 3.00% | <4.00% | 24 h | 0.998 | ± 0.004 |
| | TMPAE-0.5 | TMPTMP | 3.00% | <4.00% | 24 h | 0.967 | ± 0.005 |
| | TMPAE-0.9 | TMPTMP | 3.00% | <4.00% | 24 h | 0.957 | ± 0.005 |
| Varying Diol | 1,4-BD-0.9 | 3TI | 3.00% | <4.00% | 24 h | 0.964 | ± 0.012 |
| | CHDM-0.9 | 3TI | 3.00% | <4.00% | 24 h | 0.893 | ± 0.015 |
| | DEG-0.9 | 3TI | 3.00% | <4.00% | 24 h | 0.932 | ± 0.010 |
| | 2,2-DMPD-0.9 | 3TI | 3.00% | <4.00% | 24 h | 0.831 | ± 0.057 |
| Varying DCHMDI Co-Monomer | DCHMDI-0.0 | PETMP | 3.00% | <4.00% | 24 h | 0.985 | ± 0.012 |
| | DCHMDI-0.1 | PETMP | 3.00% | <4.00% | 24 h | 0.998 | ± 0.016 |
| | DCHMDI-0.5 | PETMP | 3.00% | <4.00% | 24 h | 0.981 | ± 0.011 |
| | DCHMDI-1.0 | PETMP | 3.00% | <4.00% | 24 h | 0.986 | ± 0.015 |
| Varying % Solvent During Cure | TMPAE-0.9 | TMPTMP | 3.00% | 300% | 24 h | 0.987 | ± 0.014 |
| | TMPAE-0.9 | TMPTMP | 3.00% | 100% | 24 h | 0.992 | ± 0.007 |
| | TMPAE-0.9 | TMPTMP | 3.00% | 50% | 24 h | 0.985 | ± 0.017 |
| | TMPAE-0.9 | TMPTMP | 3.00% | 25% | 24 h | 0.992 | ± 0.009 |
| | TMPAE-0.9 | TMPTMP | 3.00% | 10% | 24 h | 0.997 | ± 0.008 |
| | TMPAE-0.9 | TMPTMP | 3.00% | 4% | 24 h | 0.998 | ± 0.004 |
| Varying Polythiol | TMPAE-0.1 | EGBMP | 3.00% | <4.00% | 24 h | 0.818 | ± 0.031 |
| | TMPAE-0.1 | TMPTMP | 3.00% | <4.00% | 24 h | 0.946 | ± 0.006 |
| | TMPAE-0.1 | PETMP | 3.00% | <4.00% | 24 h | 0.997 | ± 0.007 |
| | TMPAE-0.1 | DPEHMP | 3.00% | <4.00% | 24 h | 0.917 | ± 0.049 |
| Varying Photoinitiator | TMPAE-0.9 | TMPTMP | 0.10% | <4.00% | 24 h | 0.981 | ± 0.021 |
| | TMPAE-0.9 | TMPTMP | 1.00% | <4.00% | 24 h | 0.979 | ± 0.015 |
| | TMPAE-0.9 | TMPTMP | 10.00% | <4.00% | 24 h | 0.974 | ± 0.009 |

FIG. 4

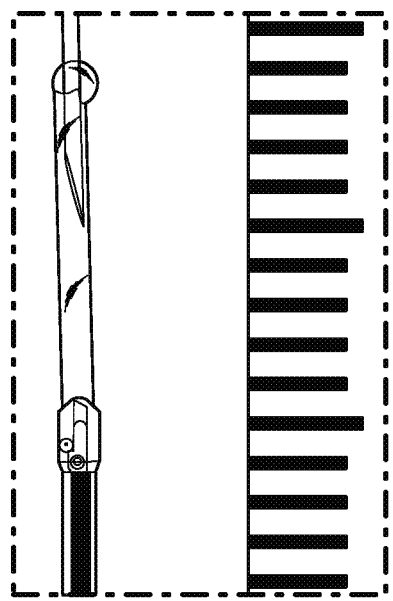
FIG. 8A
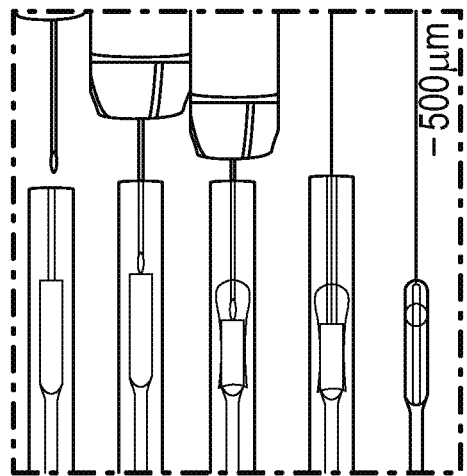
FIG. 8B
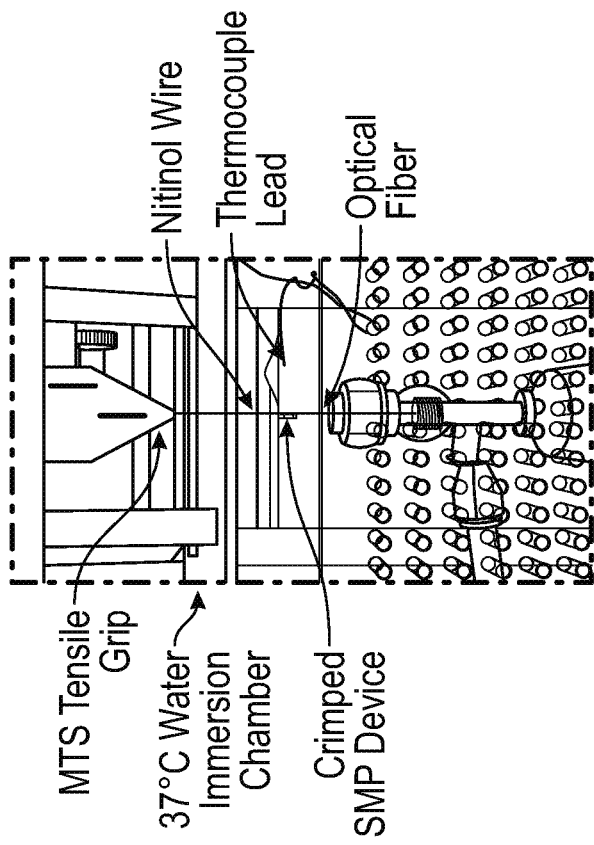
FIG. 8C
| Device | Max Force (N) |
|---|---|
| 1 | 1.75 |
| 2 | 1.86 |
| 3 | 1.30 |
| 4 | 1.75 |
| 5 | 1.34 |
| 6 | 0.90 |
| 7 | 1.10 |
| Average | 1.43 ± 0.37 |
FIG. 8D

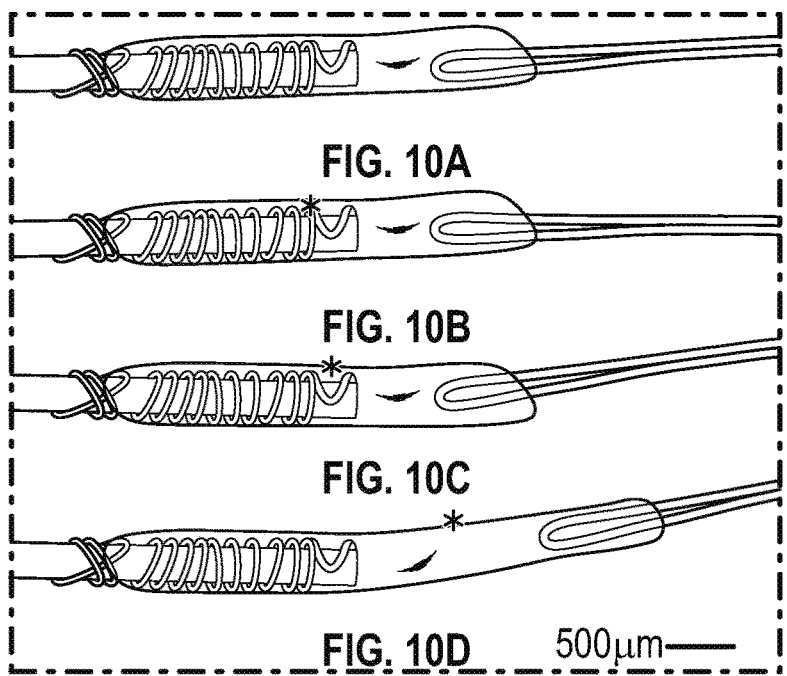
FIG. 10A
FIG. 10B
FIG. 10C
FIG. 10D
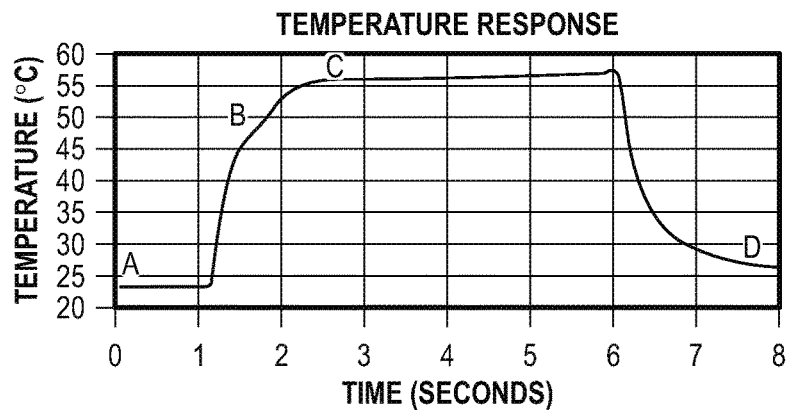
FIG. 10E
| | AVERAGE | STDEV | SAMPLE SIZE |
|---|---|---|---|
| FINAL CRIMPED DIAMETER | 437 μm | 43 μm | 34 |
| TENSILE STRENGTH | 1.96 N | 0.56 N | 13 |
| 23 °C ACTUATION PERCENTAGE | 61% | - | 18 |
| IN *VITRO* ACTUATION | 100% | - | 3 |
FIG. 10F

500μm

500μm

500μm 1 cm

PROCESSABLE, TUNABLE THIOL-ENE CROSSLINKED POLYURETHANE SHAPE MEMORY POLYMERS

CROSS-REFERENCE TO RELATED APPLICATION

This application is a continuation of U.S. patent application Ser. No. 15/548,212, filed Aug. 2, 2017, which is a § 371 national stage of international application PCT/US2016/016167, which filed Feb. 2, 2016, which claims priority to both: (a) U.S. Provisional Patent Application No. 62/111,233 filed on Feb. 3, 2015 and entitled "A Processable, Tunable Thiol-ene Crosslinked Polyurethane Shape Memory Polymer System for Biomedical Applications", and (b) U.S. Provisional Patent Application No. 62/144,819 filed on Apr. 8, 2015 and entitled "Shape Memory Polymer Compositions and Their Uses." The content of each of the above applications is hereby incorporated by reference.

STATEMENT OF FEDERALLY FUNDED RESEARCH

The U.S. Government may have certain rights in this invention pursuant to: Contract No. DE-AC52-07NA27344 awarded by the U.S. Department of Energy, National Science Foundation Graduate Research Fellowship #2011113646, National Institutes of Health/National Institute of Biomedical Imaging and Bioengineering Grant R01EB000462, and/or National Science Foundation Contract No. CHE-1057441.

TECHNICAL FIELD

Embodiments of the invention are in the field of polymer chemistry.

BACKGROUND

Shape memory materials (SMPs) feature an ability to transform shape from a temporary shape to a permanent shape when triggered by an environmental stimulus, such as heat, light, or vapor. These phenomena can be exploited for a wide range of applications. SMPs intrinsically exhibit shape memory effects derived from their highly coiled constituent chains that are collectively extensible via mechanical work and this energy may be stored indefinitely, known as "shape fixing," by cooling below glass transition temperature ($T_g$) or melting temperature ($T_m$). The polymeric samples can later perform mechanical work and return to a stress-free state when heated above the critical temperature, mobilizing the frozen chains to regain the entropy of their coiled state. Thermally stimulated SMPs have the advantages of: (i) large recoverable deformations in excess of several hundred percent strain; (ii) facile tuning of transition temperatures through variation of the polymer chemistry; and (iii) processing ease at low cost.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIG. 3 includes a table of compositions and molecular weights as determined by GPC analysis and structures for monomers and polythiol crosslinkers used to prepare thiol-ene crosslinked polyurethane shape memory polymers.

FIG. 4 includes a table of Sol/Gel analysis data for thiol-ene crosslinked polyurethane shape memory polymers prepared using various synthetic conditions.

FIGS. 8(a), 8(b), 8(c), 8(d) depict 8(a) device fabrication showing liquid solution of thermoplastic PU, photoinitiator, and polythiol after injection into glass mold before UV curing; 8(b) crimping process for ball-tipped simulated embolic device and UV cured microgripper device; 8(c) experimental setup for tensile testing experiments for crimped device assemblies; 8(d) maximum stresses measured in tensile testing experiments for seven crimped devices.

FIGS. 10(A), 10(B), 10(C), 10(D), 10(E), 10(F) depict sequenced images depicting device actuation (asterisks identify the expanded portion of the SMP tube) and temperature at each stage of release.

DETAILED DESCRIPTION

Figure 1:
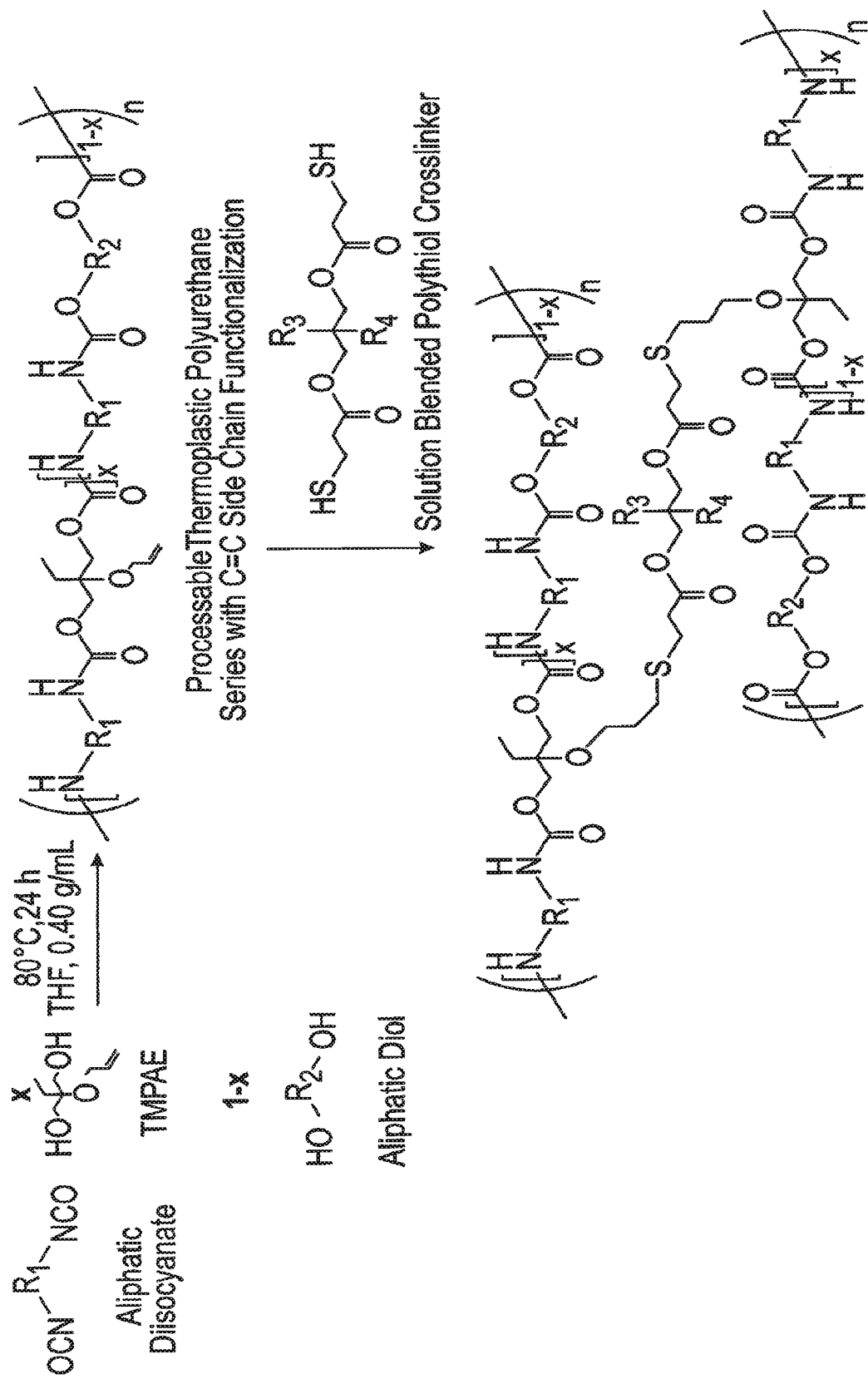
FIG. 1 depicts a synthetic strategy utilized in an embodiment. Different embodiments use any aliphatic diisocyanate for "R1", any alkene substituted diol represented by "x", any aliphatic diol for "R2", and any polythiol crosslinker for "R3" and "R4", including, but not limited to, those listed in FIG. 3.

Reference will now be made to the drawings wherein like structures may be provided with like suffix reference designations. In order to show the structures of various embodiments more clearly, the drawings included herein are diagrammatic representations of structures. Moreover, the drawings may only show the structures useful to understand the illustrated embodiments. Additional structures known in the art may not have been included to maintain the clarity of the drawings. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact.

Thermally stimulated SMPs with different thermomechanical properties to function in various applications, for example as medical devices and mechanical actuators, have previously been synthesized and characterized. These include laser and resistively actuated SMP embolic and endovascular devices. However, some of the drawbacks of these devices include (1) the presence of dopants in a gradient and (2) high crosslink density in the polymers. The former results in non-uniform heating of the polymer, while the latter results in polymers lacking the requisite strain capacity for devices that need to be crimped. Thus, a need exists for SMP compositions that are capable of overcoming the disadvantages seen in the prior art compositions.

An embodiment includes a platform shape memory polymer system (e.g., for biomedical device applications or other applications unrelated to biomedical applications) is described herein. Such an embodiment exhibits a blend of tunable, high performance mechanical attributes in combination with advanced processing capabilities and good biocompatibility. A post-polymerization crosslinking synthetic approach is employed that combines polyurethane and thiolene synthetic processes. Such a material is used for exemplary purposes in a microactuator medical device that demonstrates the processing capability of the embodiment.

Embodiments include polyurethane SMPs with tunable thermomechanical properties and advanced processing capabilities have been synthesized, characterized, and implemented in the design of a microactuator medical device prototype. The ability to manipulate $T_g$ and crosslink density in low-molecular weight aliphatic thermoplastic polyurethane SMPs is demonstrated using a synthetic approach that employs UV catalyzed thiol-ene "click" reactions to achieve post-polymerization crosslinking. PUs containing varying C=C functionalization are synthesized, solution blended with polythiol crosslinking agents and photoinitiator and subjected to UV irradiation, and the effects of a number of synthetic parameters on crosslink density are reported herein. Thermomechanical properties are highly tunable, including glass transitions tailorable between 30 and 105° C. and rubbery moduli tailorable between 0.4 and 20 MPa. Such embodiments exhibit high toughness for many formulations, especially in the case of low crosslink density materials, for which toughness exceeds 90 MJ/m$^3$ at select straining temperatures. To demonstrate the advanced processing capability and synthetic versatility of several such embodiments, a laser-actuated SMP microgripper device for minimally invasive delivery of endovascular devices is fabricated, shown to exhibit an average gripping force of 1.43±0.37 N and successfully deployed in an in vitro experimental setup under simulated physiological conditions.

A more generalized discussion now follows.

1. DISCUSSION

The materials science of human anatomy constitutes tremendous variations in tissue modulus and architecture. Materials-based avenues to solving biomedical engineering challenges depend both on a material's ability to be processed into desired geometries and on the extent to which material properties can be tailored to meet the demands of various applications. SMPs are a class of stimuli-responsive materials that exhibit geometric transformations in response to subjection to external stimuli such as heating or light exposure, and a number of SMP-based biomedical implant devices are currently being proposed.[1] For SMP-based medical devices, the functional utility that arises from a clinician's ability to trigger geometric transformations after device implantation in the body is both multi-dimensional in nature and complex in conceptualization. Various applications may demand SMPs with tailorable actuation temperature, recoverable strain, recovery stress, modulus at physiological conditions and toughness, in addition to good biocompatibility.[2] Devices also often have complex geometric design requirements, and a material's ability to be processed using certain fabrication techniques often influences the material selection process in device design.[3] A high performance SMP system with tunable thermomechanical properties, high toughness and good biocompatibility that can be readily synthesized and processed in atmospheric conditions into desired geometries for device fabrication is of importance for a variety of biomedical applications.[4-6] A focus of embodiments described herein is to introduce an amorphous, thermally actuated shape memory polymer system that exhibits robust, highly tunable material properties and advanced processing capabilities and to demonstrate some of the embodiments' viability as a platform system for medical device design through the fabrication of a laser actuated SMP-based microgripper designed to facilitate microcatheter delivery of implantable endovascular devices. Of course embodiments are in no way limited to biomedical applications.

The tunability of material properties, toughness and processability of many SMP systems has been shown to be highly dependent on the nature and extent of crosslinking in the SMPs.[7] Chemical constituents in polymeric backbones or side chains can exhibit physical crosslinking interactions that influence a number of material properties, including glass transition and toughness. Additionally, the environmental conditions required to synthesize polymers comprised of certain chemical functionalities may dictate which fabrication techniques can be employed during polymer processing. From a macromolecular architecture standpoint, covalent crosslinking affords certain advantages in mechanical behavior while simultaneously limiting many aspects of material processing capability. For a thermally actuated, one-way SMP, the polymer constituents that undergo thermal transitions upon heating or cooling across the SMP switching temperature $T_{trans}$ are referred to as "switching segments," and crosslinks, whether covalent, physical, or other are referred to as "netpoints." Netpoints prevent switching segment chains from permanently sliding past one another during straining to a secondary geometry by effectively acting as anchors that enable shape recovery to occur.[8] Covalently crosslinked SMP systems often exhibit advantages in mechanical behavior over those of physically crosslinked SMP systems, including better cyclic shape memory and greater percent recoverable strains. In contrast, thermoplastic SMPs often possess significant processing advantages over thermosets, which do not flow at elevated temperatures and pressures and do not dissolve in solvents.[9] Thermoplastic processing techniques such as 3D printing, extrusion, injection molding and solution casting are especially useful when high-throughput processing and/or complex prototype fabrication are desired.[10] For medical device applications in particular, a thermoplastic SMP that is capable of being processed into a desired geometry in atmospheric conditions and subsequently crosslinked in a secondary step to tailorable crosslink densities may offer significant advantages over current SMP materials because it enables the use of thermoplastic manufacturing techniques for creating complex geometries while still utilizing the advantageous mechanical properties of a thermoset SMP.[11]

Reported herein are embodiments such as an embodiment that is an amorphous, aliphatic polyurethane (PU) SMP system designed to exhibit tunable crosslink density and glass transition ($T_g$), high toughness and good biocompatibility, as well as advanced processing capabilities in atmospheric conditions. One advantage of PUs is the high toughness that results from inter-chain hydrogen bonding between carbamate linkages,[12] and many aliphatic PUs have also been shown to exhibit good biocompatibility.[13] One major disadvantage of PUs is the fact that isocyanate-based PU syntheses must be carried out in moisture-free environments such as glove boxes to prevent isocyanate side reactions, and many commercially available PUs are thermoplastics that have been pre-synthesized by manufacturers to allow for processing into desired geometries in atmospheric conditions. If applications should require the high toughness afforded by urethane chemistry and the mechanical robustness provided by covalent crosslinking while also demanding processability in atmospheric conditions, one strategy that allows for the incorporation of urethane linkages into covalently crosslinked networks in atmospheric synthetic environments is the synthesis of monomers, oligomers, or thermoplastic precursors containing internal carbamate linkages that are functionalized with groups that can be subsequently cured in a secondary step using alternative polymerization methods.[14, 15] Thiol-ene "click" chemistry is a powerful synthetic tool that can proceed to high conversion in atmospheric conditions,[16] and Nair and co-workers from Bowman, Shandas and co-workers have reported an SMP system that is prepared by functionalizing isophorone diisocyanate (IPDI) to afford polyalkene and polythiol monomers with internal (thio)urethane linkages, which are curable using thiol-ene "click" reactions upon UV irradiation.[17] Beigi, et al. have investigated the use of alkene-functionalized IPDI as a co-monomer in thiol-ene-methacrylate systems as a resin matrix for dental applications,[18] and a number of studies have also reported the synthesis of thiol-ene crosslinked waterborne PU coatings from alkene end-capped urethane-ester-urethane trimers.[19, 20] Because of the high number of flexible thioether linkages that result from the bulk curing of thiol-ene monomers, even when such monomers contain internal carbamate linkages, a number of poly (thioether-co-urethane) hybrid networks reported in the literature exhibit glass transitions below or near 25° C., and these elastomeric materials may not be suitable for use in certain engineering polymer applications. Although $T_g$ can be increased by increasing crosslink density in thiol-ene polymer systems, this increase in crosslinking is often accompanied by a tradeoff in decreased toughness, and achieving independent control of crosslink density and $T_g$ in thiol-ene systems is often a synthetic challenge.[21] For amorphous, thermally actuated shape memory polymer systems in particular, achieving independent control of $T_g$ and crosslink density (i.e., actuation temperature and recovery stress) is a key material design objective that influences the scope of a SMP system's potential application range.

To develop a versatile polyurethane SMP system that excels in enough materials characterization areas to support its presentation as a platform SMP system for biomedical device design, embodiments addressed herein detail a synthetic strategy in which thermoplastic PUs are prepared from aliphatic diisocyanates and varying ratios of C=C and non-C=C functionalized diols, as shown in FIG. 1. After thermoplastic synthesis, crosslinking is achieved by solution blending of thermoplastics with polythiol crosslinking agents and photoinitiator and subsequent UV irradiation. This post-polymerization crosslinking approach allows for polyurethane-based SMP devices to be fabricated in atmospheric conditions, and the toughness and thermomechanical properties of these SMPs are primarily influenced by the linkages in the thermoplastic PUs, which statistically significantly outnumber the thioether linkages in the crosslinked materials. Furthermore, the incorporation of C=C linkages into PU side chains by PU step growth polymerization produces fairly uniform distribution of C=C functionalities, which, upon crosslinking with polythiols, affords poly(thioether-co-urethane) networks with high network homogeneity and narrow glass transition breadths, which enable precise and rapid shape actuation for SMP-based devices.[22] While previous studies report the syntheses of urethane/thiol-ene hybrid network SMPs from monomeric functionalized precursors that often exhibit mechanical behavior that is more consistent with that of a thiol-ene network than that of a polyurethane, this study employs a synthetic strategy that affords materials that exhibit mechanical behavior consistent with that of polyurethanes. Consequently, the synthetic challenges that have occurred because of the low $T_g$ and high crosslink densities associated with thiol-ene networks can be overcome, and a platform SMP system with widely tunable material properties and advanced processing capability can be developed.

Figure 2:
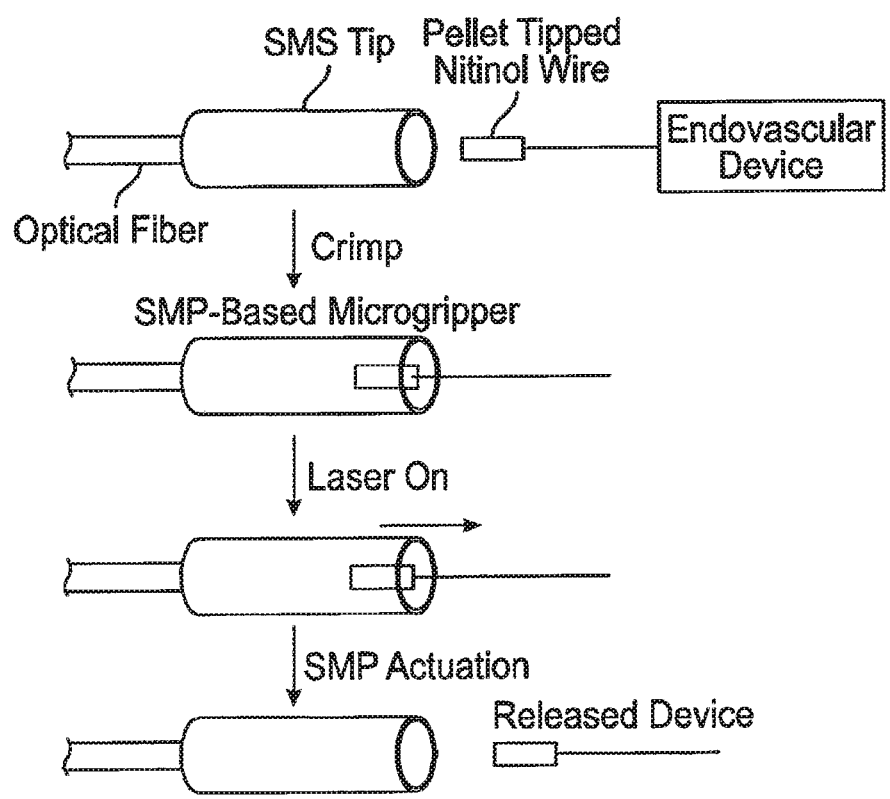
FIG. 2 is a schematic diagram for a laser actuated SMP microgripper. Solutions of thermoplastic PU and polythiol doped with Epolin 4121 were first solution cast over a cleaved optical fiber to form the SMP gripper. Pellet tipped nitinol was then axially crimped into the gripper.

To demonstrate the processing capability of an embodiment, a prototype microactuator device is also synthesized and characterized herein. One advantage to the solution blending aspect of the synthetic process used to fabricate this device is the solvent's ability to uniformly disperse non-reactive additives throughout the thermoplastic PU/polythiol solutions. The device fabricated in this study constitutes a new design for a light-actuated SMP microgripper, which is designed for the purpose of delivering endovascular devices via microcatheter. Utilizing the properties of embodiments described herein, such embodiments can improve upon a microactuator device previously reported by in 2002.[23] Embodiments, such as those of FIG. 2, offer significantly improved ease of fabrication over previously reported designs. By fabricating this microactuator device, an embodiment demonstrates (a) the ease with which non-reactive additives can be blended with embodiments of the new SMP system; (b) the use of post-polymerization crosslinking to enable the fabrication of a microscale medical device; and (c) the ability of embodiments of this new SMP system to be subjected to device fabrication in atmospheric conditions.

2. RESULTS

Addressed herein are shape memory polyurethane system embodiments used as a platform material system for use in, for example, medical device applications (but not limited to medical device applications) by (1) reporting materials characterization data that show excellent thermomechanical, shape memory and tensile behavior, as well as indications of biocompatibility and (2) demonstrating the processing advantages of embodiments of this new SMP system through the fabrication in atmospheric conditions of a laser-activated SMP microgripper device to facilitate the microcatheter delivery of implantable endovascular devices.

2.1. Achieving Tailorable Crosslink Density

Figure 5A:
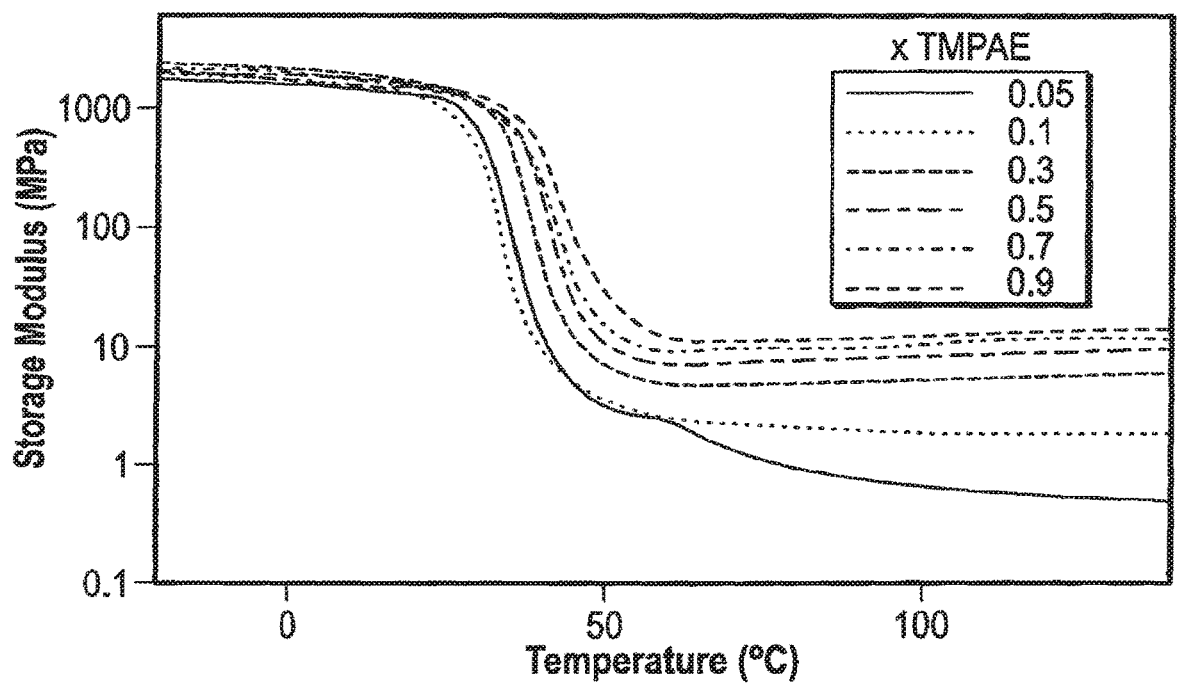
FIGS. 5(a), 5(b), 5(c), 5(d), 5(e), 5(f) depict the effects of 5(a) varying C=C composition, 5(b) varying C=C:SH ratio, 5(c) varying DMPA photoinitiator, 5(d) varying post-cure time at 120° C. at 1 torr, 5(e) varying wt % solvent present during UV curing, and 5(f) varying thiol crosslinker functionality on crosslink density of PU SMPs prepared from (x TMPAE: 1-x 3-MPD)-co-TMHDI thermoplastic polyurethanes and polyfunctional thiol crosslinking agents.
Figure 5B:
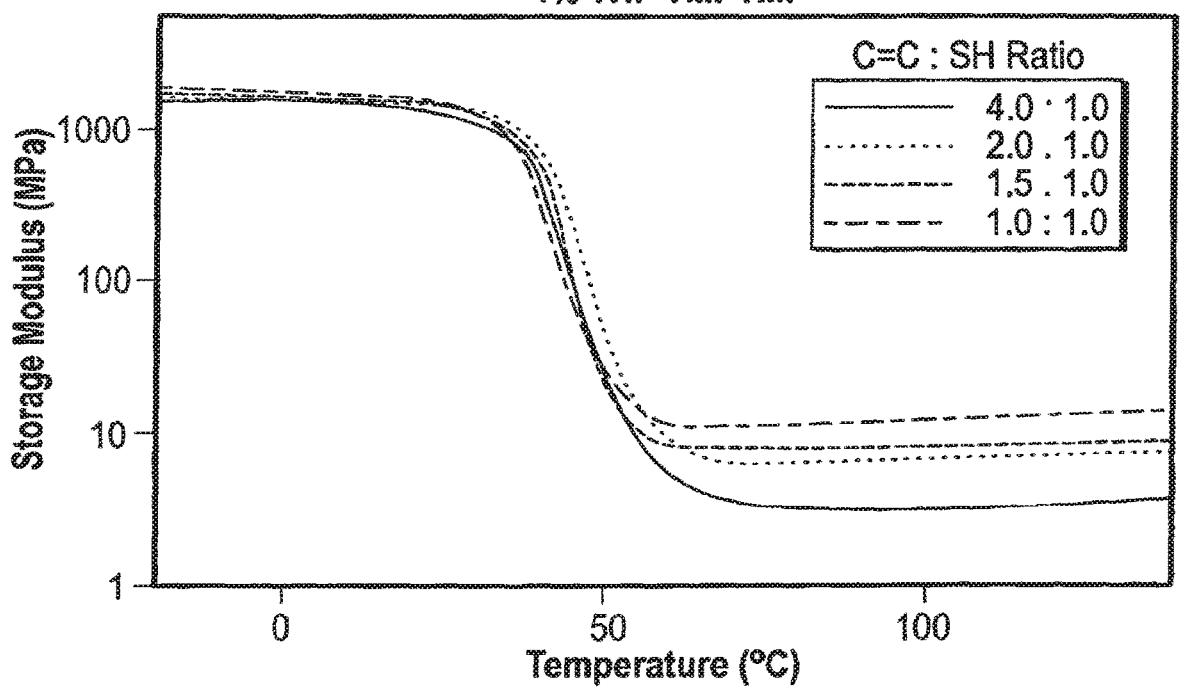
Figure 5C:
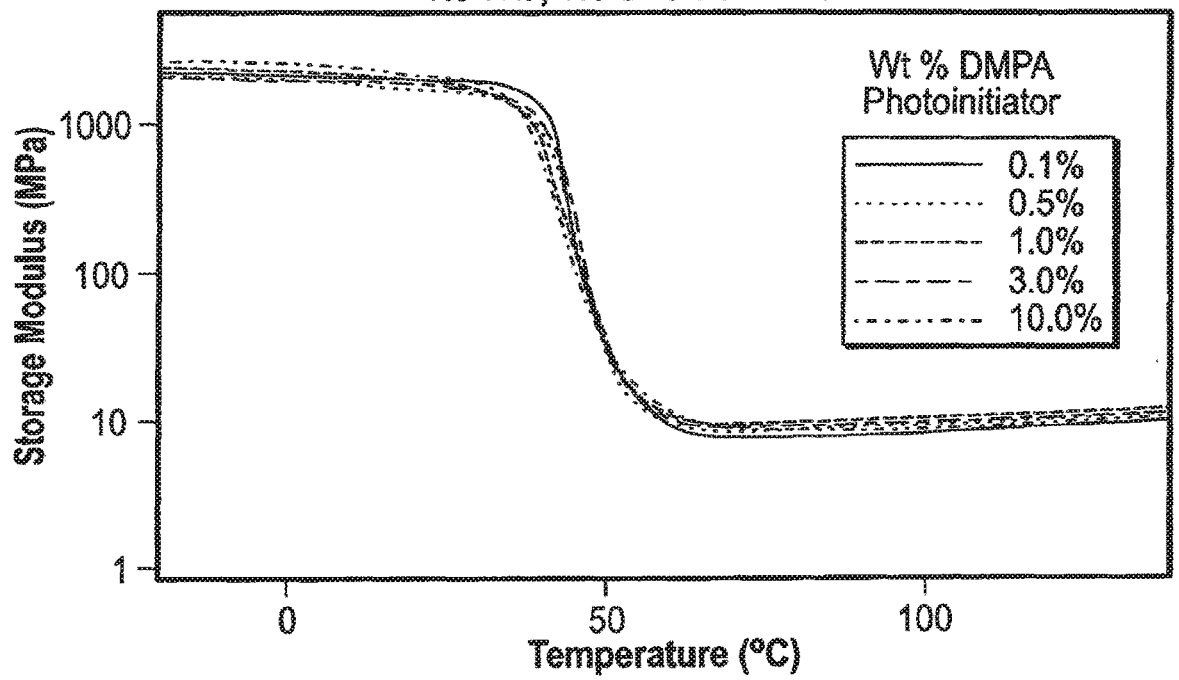
Figure 5D:
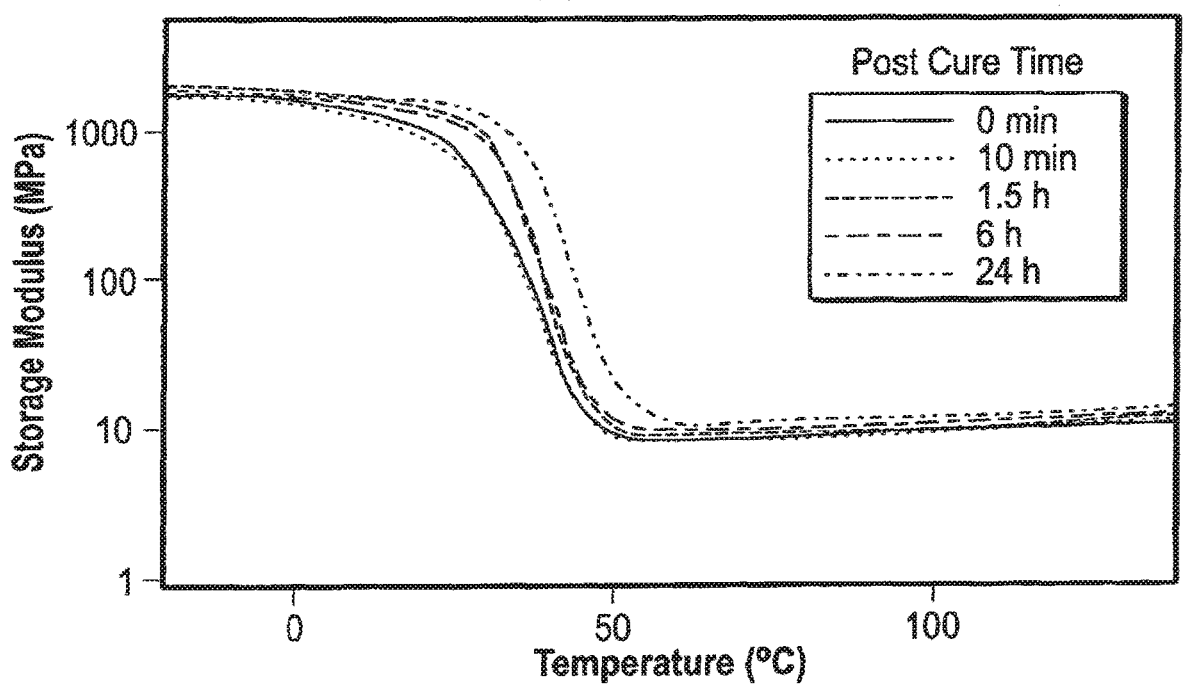
Figure 5E:
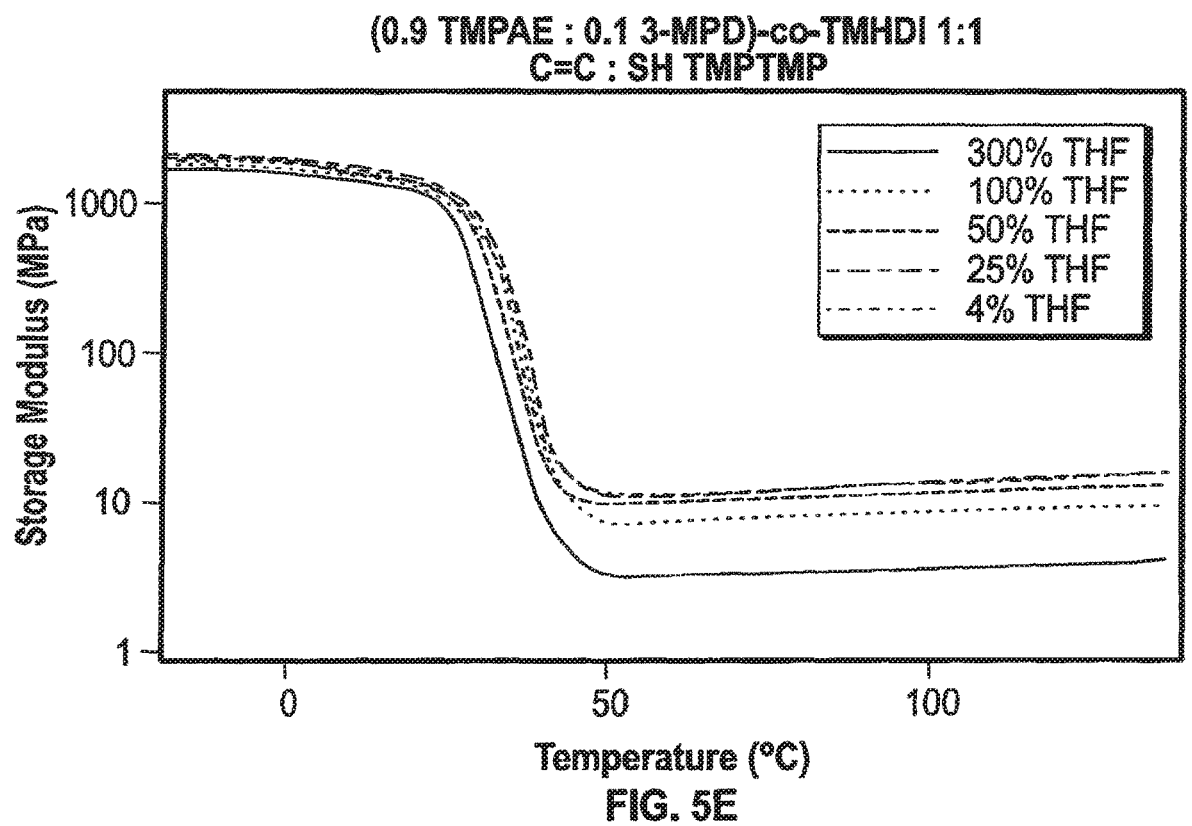
Figure 5F:
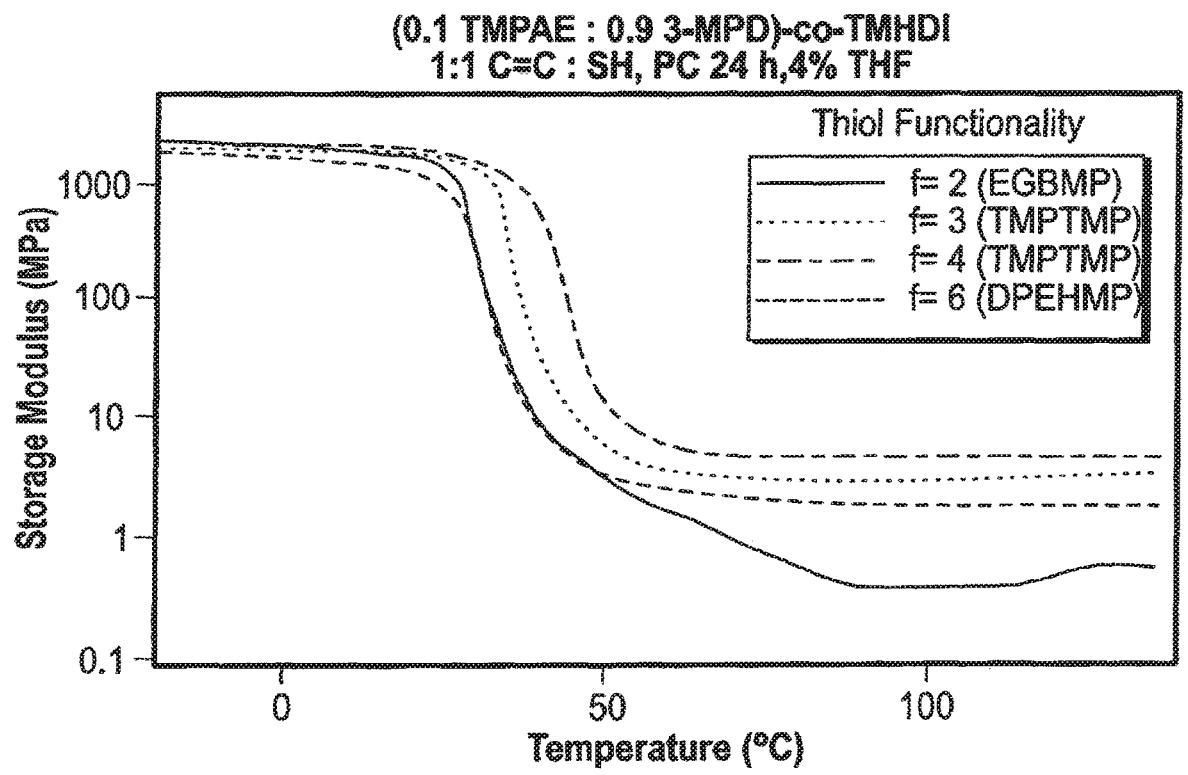

The SMP system reported herein is synthesized through a post-polymerization crosslinking process in which thermoplastic polyurethanes containing pendant C=C functionalities are first synthesized from (alkene) diol and diisocyanate monomers, as shown in FIG. 1. After thermoplastic synthesis, crosslinking is achieved by solution blending of thermoplastic PUs with polythiol crosslinking agents in atmospheric conditions and is shown to be tailorable by varying a number of synthetic parameters, many of which can be employed at the post-polymerization crosslinking step. Control over rubbery modulus was achieved over the range of 0.5 to 10.5 MPa by reacting thermoplastic urethanes comprised of varying TMPAE functionalization with 1:1 equivalents of the trithiol TMPTMP, as shown in the storage modulus data provided in FIG. 5(a). Control of rubbery modulus was also demonstrated over the range of 3.0 to 10.5 MPa for a single thermoplastic formulation comprised of 0.9 diol TMPAE fraction by crosslinking this thermoplastic with thiol equivalents ranging from 4.0 C=C:1.0 SH to 1.0 C=C:1.0 SH, as shown in FIG. 5(b). FIG. 5(c) shows a near-negligible effect of photoinitiator composition on rubbery modulus as DMPA composition is increased over three orders of magnitude, from 0.1 wt % to 10.0 wt %, and FIG. 5(d) demonstrates that both glass transition and crosslink density increased slightly over the course of a 24 h post-cure. FIG. 5(e) shows that rubbery modulus decreased from 10.5 to 3.0 MPa as THF solvent composition increased from 4% to 300% during curing. The effects of increasing polythiol crosslinker functionality for a 0.1 TMPAE diol component sample are shown in FIG. 5(f). As thiol functionality was increased from n=2 to 6, rubbery modulus increased roughly an order of magnitude, from 0.4 to 4.1 MPa.

2.2. Achieving Tailorable Glass Transition

Figure 6A:
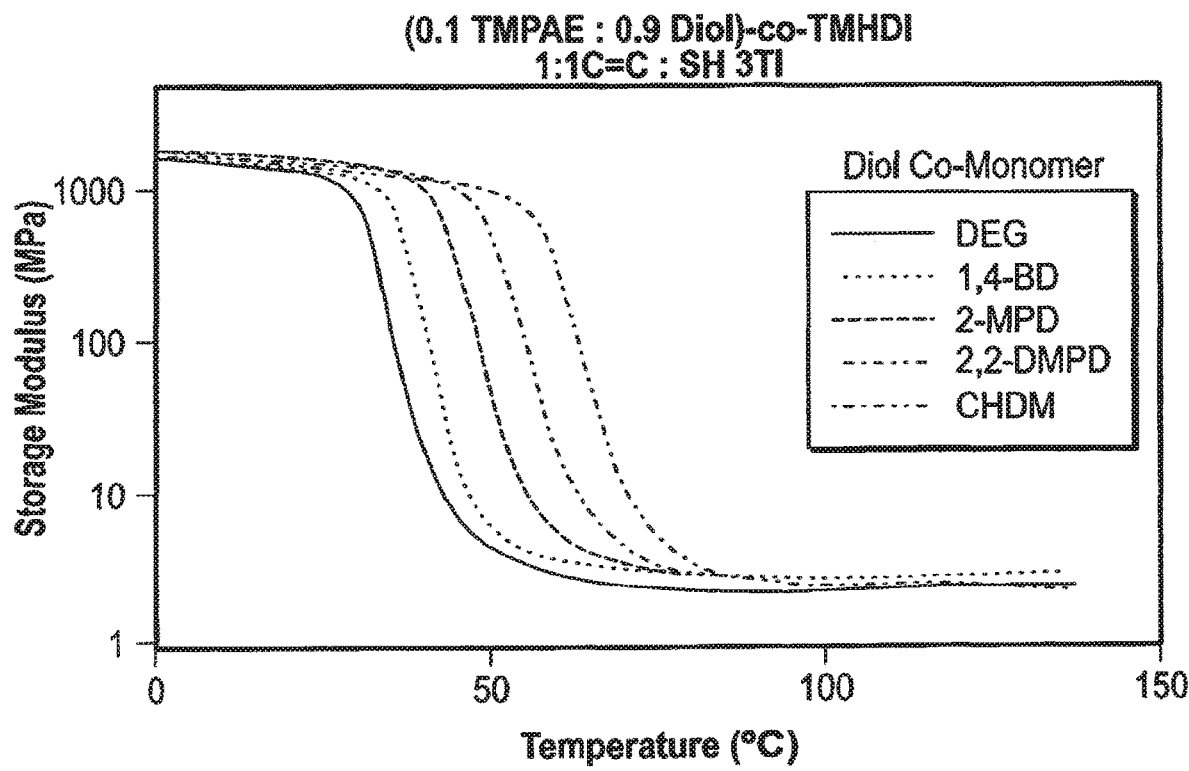
FIGS. 6(a), 6(b), 6(c), 6(d) depict the effects of varying diol co-monomer (diol: TMPAE=0.9:0.1) and varying diisocyanate co-monomer ratio on glass transition temperature.
Figure 6B:
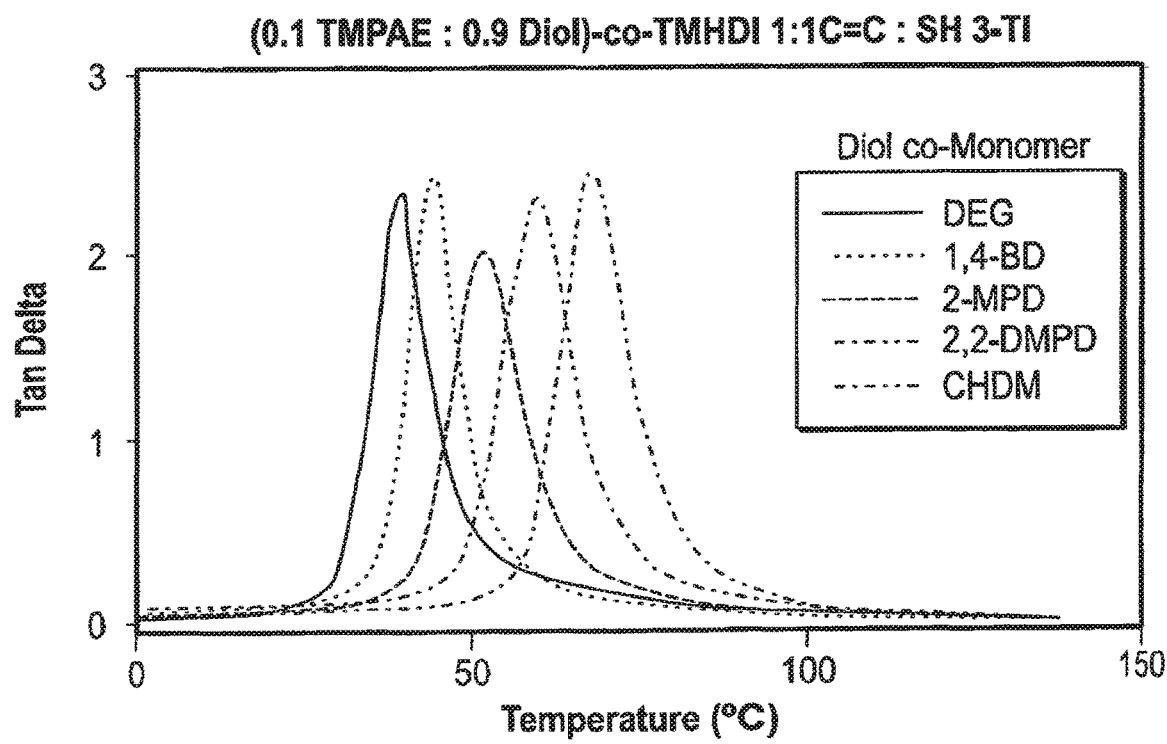
Figure 6C:
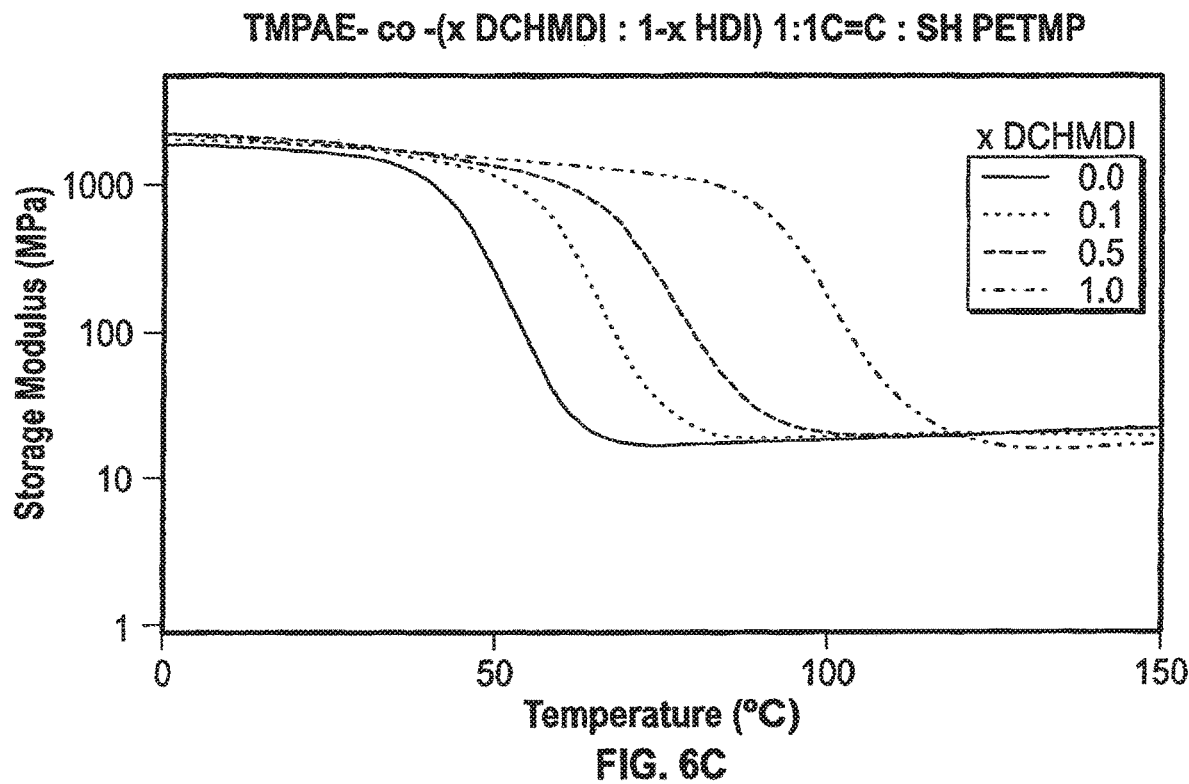
Figure 6D:
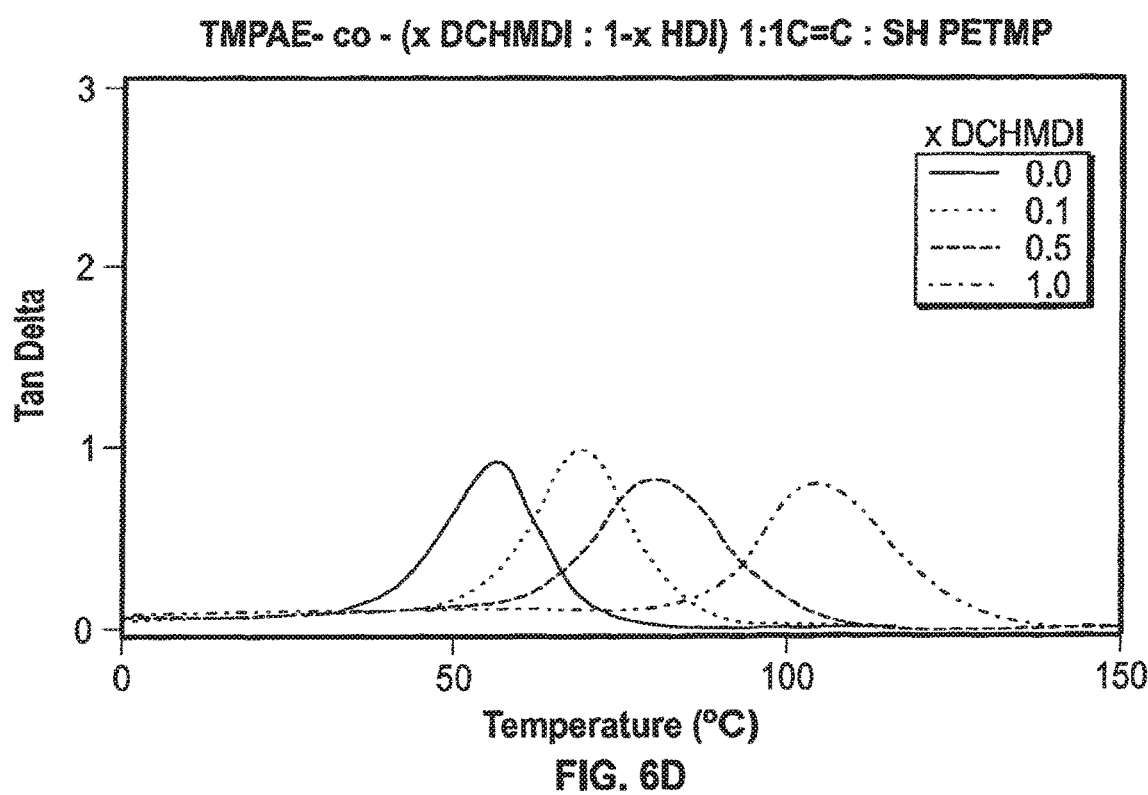

To achieve synthetic control over glass transition, two approaches are reported. First, control of $T_g$ was attempted by varying diol co-monomer composition for thermoplastics comprised of low C=C diol monomer composition (0.10 TMPAE, 0.90 diol), as shown in FIG. 3. Instead of selecting a "high-$T_g$" and "Low-$T_g$" diol and moving glass transition by blending such diols in varying ratios, the 0.10 TMPAE: 0.90 diol varying $T_g$ series was formulated to provide increased network homogeneity and more narrow glass transition breadths. FIGS. 6(a) and 6(b) show a $T_g$ range of approximately 38 to 70° C. and a roughly constant rubbery modulus of approximately 2.1 MPa for all samples, which were prepared from thermoplastics with 0.10 TMPAE and varying 0.90 diol co-monomer constituents. A minimum $T_g$ of 38° C. was observed for the diethylene glycol (DEG) co-monomer, and a maximum $T_g$ of 70° C. $T_g$ was observed for the cyclohexanedimethanol (CHDM) co-monomer in the 0.10 TMPAE series. $T_g$ breadths were narrow and ranged from 9° C. to 12° C. (tangent delta full width half maximum, FWHM). This observed sharpness in glass transition breadths indicates that the synthetic strategy of varying $T_g$ by varying the entire saturated diol co-monomer compositions is an effective route to achieving high network homogeneity. To provide a second manner of tailoring glass transition, a series of thermoplastics was prepared from 0.9 TMPAE and varying ratios of HDI and DCHMDI diisocyanate co-monomers. As the DMA data in FIGS. 6(c) and 6(d) show, as DCHMDI composition increased from 0.0 to 1.0, $T_g$ increased from 56 to 105° C., and rubbery modulus for this SMP series remained roughly constant, in the range of 16.4 to 17.1 MPa. $T_g$ breadth ranged from 16° C. to 23° C. and was greatest for the 0.5 HDI: 0.5 DCHMDI composition, which was comprised of the most heterogeneous formulation.

Figure 7A:
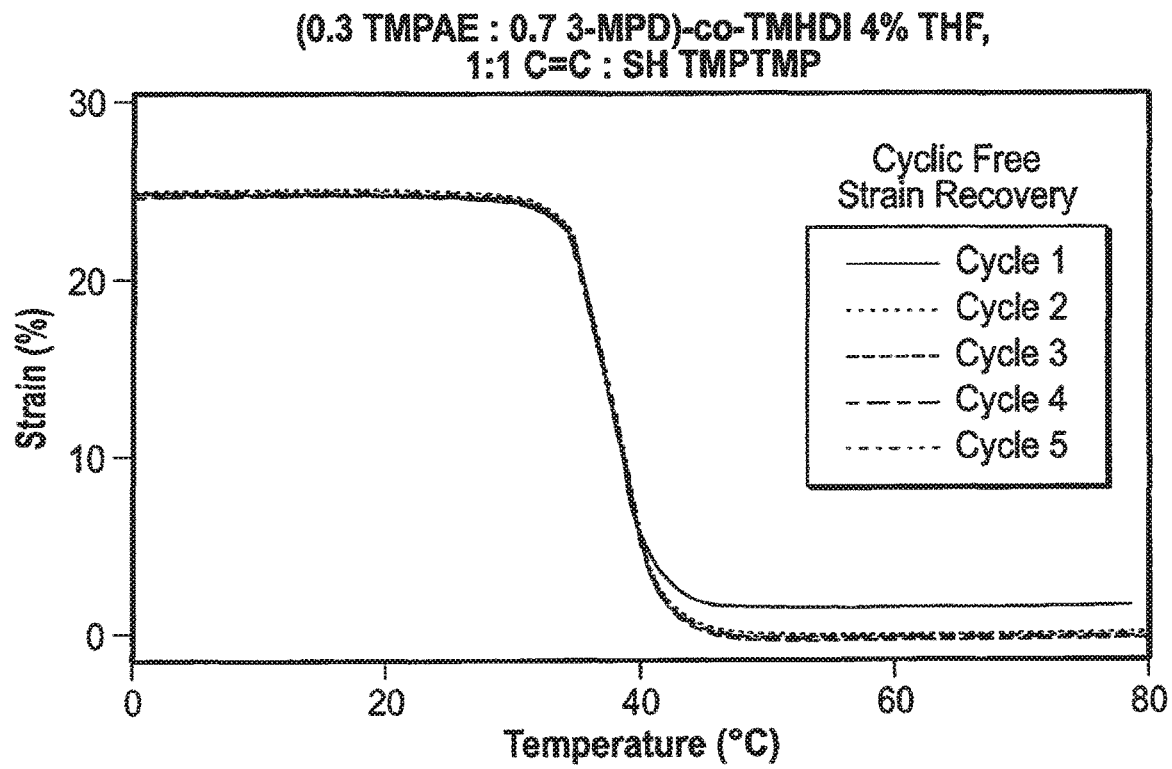
FIGS. 7(a), 7(b), 7(c), 7(d) depict materials characterization data demonstrating the material advantages of an embodiment. 7(a) includes 5-cycle free strain recovery shape memory characterization results for (0.3 TMPAE: 0.7 3-MPD)-co-TMHDI SMP; 7(b) includes constrained recovery for samples with increasing TMPAE composition; 7(c) includes Strain-to-Failure results for thiol-ene crosslinked PU SMP samples made from TMHDI and varying ratios of TMPAE and 3-MPD (i.e., varying C=C composition); 7(d) includes cytotoxicity results showing mouse 3T3 fibroblast viabilities greater than 93% were observed for TMPAE-0.05, TMPAE-0.3, and TMPAE-0.7 thiol-ene crosslinked polyurethanes for 72 h direct contact studies.
Figure 7B:
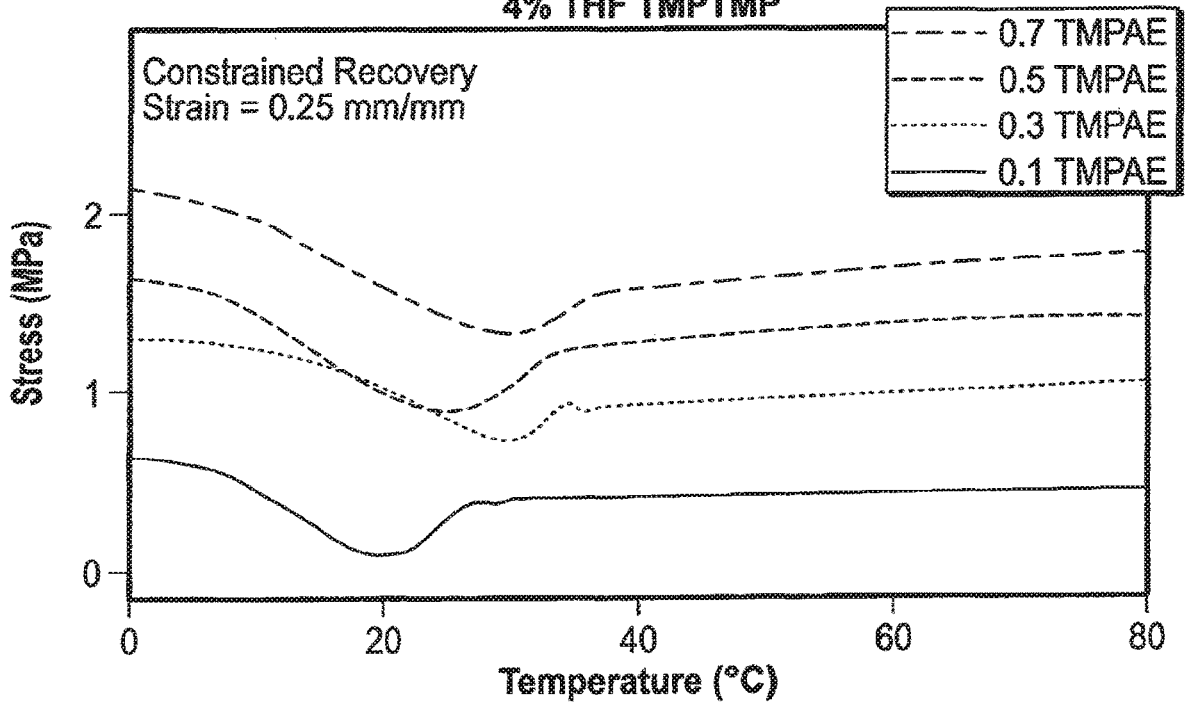

2.3. Shape Memory Characterization, Tensile Testing, and Biocompatibility Results One demonstrated advantage of covalently crosslinked SMP systems is good shape memory behavior, which includes high percent recoverable strains during cyclic testing and recovery stresses that are tunable by varying covalent crosslink density. In FIG. 7(a), free strain recovery data showing recoverable strain versus temperature over five straining cycles is shown for the (0.3 TMPAE: 0.7 3-MPD)-co-TMHDI SMP crosslinked with TMPTMP, which was subjected to 25% prestrain in each cycle. During Cycle 1, this SMP exhibits a recoverable strain of 94.5%, and during Cycles 2 to 5, its recoverable strain approaches 100%. In FIG. 7(b), constrained recovery data showing recoverable stress versus temperature for (x TMPAE: 1-x 3-MPD)-co-TMHDI SMPs crosslinked with TMPTMP are shown. These constrained recovery data are for four samples subjected to 25% prestrain with TMPAE compositions of 0.1, 0.3, 0.5, and 0.7, respective rubbery modulus values of 1.7, 4.5, 6.9, and 8.9 MPa and respective max recovery stress values of 0.4, 0.9, 1.2, and 1.4 MPa. Increasing rubbery modulus/ implied increasing crosslink density results in increasing recovery stress, and tailoring crosslink density constitutes an experimentally demonstrated approach to tuning recovery stress.

Figure 7C:
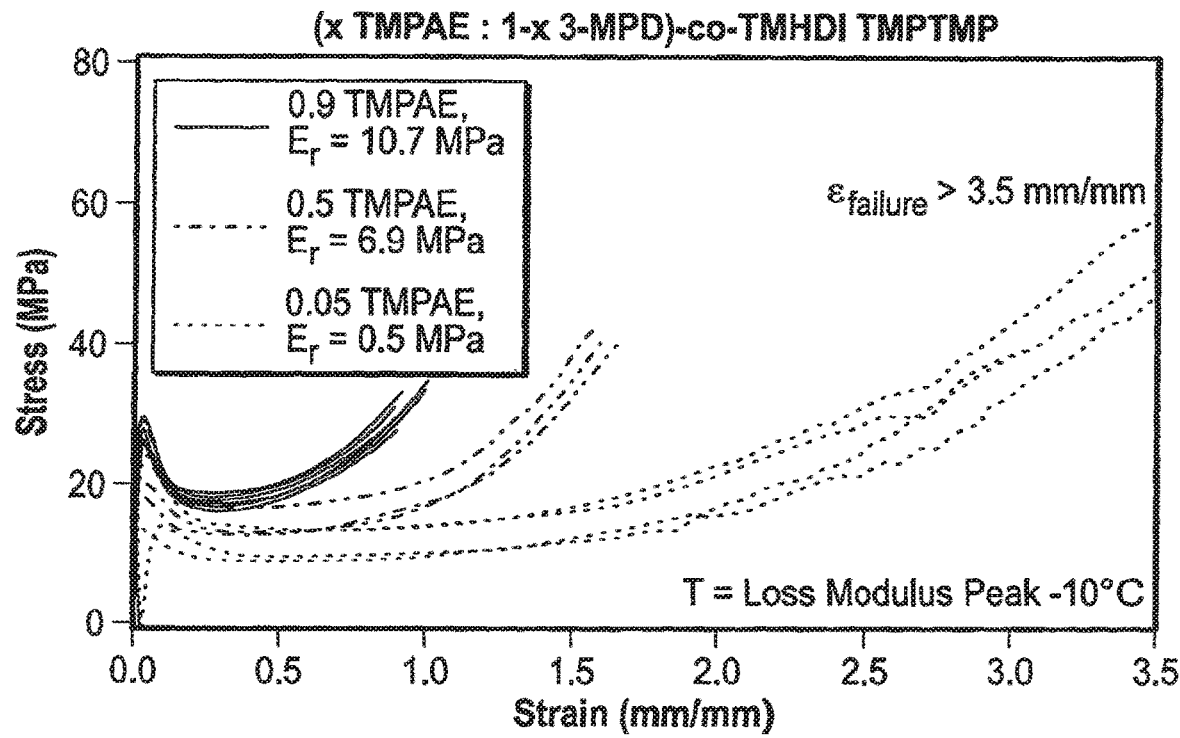

Strain-to-failure data were obtained by conducting experiments at $T=T_{loss\ modulus}-10°$ C. for (x TMPAE: 1-x 3-MPD)-co-TMHDI samples crosslinked with TMPTMP and are provided in FIG. 7(c). These tensile testing experiments were run at temperatures demonstrated in previous studies to be representative of maximum toughness states for comparable aliphatic polyurethanes.[24] TMPAE compositions of 0.05, 0.5, and 0.9, which exhibited rubbery moduli of 0.5, 6.9, and 10.5 MPa, respectively, were selected for strain to failure testing at equivalent temperatures relative to each material's loss modulus peak temperature as determined by DMA. Average toughness was calculated to be >90.0 MJ/m$^3$ for the 0.05 TMPAE sample, which did not break in the extension range of the tensile tester, 36.3±3.9 MJ/m$^3$ for the 0.5 TMPAE sample and 20.9±2.1 MJ/m$^3$ for the 0.9 TMPAE sample. Toughness was shown to decrease with increasing crosslink density.

Figure 7D:
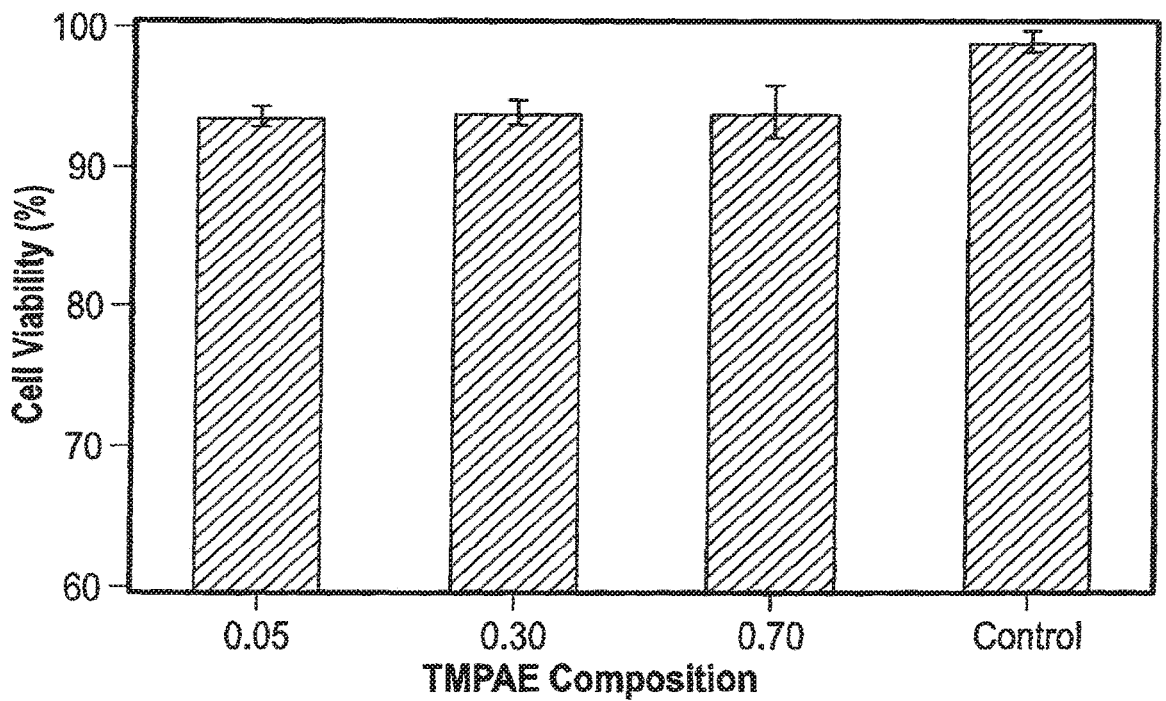

Cell viability data for mouse 3T3 fibroblasts after direct contact exposure for 72 h to (x TMPAE: 1-x 3-MPD)-co-TMHDI samples crosslinked with TMPTMP are provided in FIG. 7(d). Samples with TMPAE compositions of 0.05, 0.3, and 0.7 exhibited average 72 h percent cell viabilities of 93.5±0.7%, 93.8±0.8%, and 93.8±1.9%, while the control exhibited a cell viability of 98.8±0.7%.

2.4. SMP Microgripper Device Characterization Results

In order to approximate the maximum forces to which the crimped microgripper/ball-tipped assemblies could be subjected during microcatheter delivery of endovascular devices, tensile testing experiments were run to measure device gripping forces in an MTS tensile testing system as pictured in FIG. 8(c). Using the immersion chamber of the MTS system, strain-to-failure experiments were carried out on seven devices in water at 37° C. FIG. 8(d) shows a table of gripping force at failure values for each of seven devices tested, and the average gripping force was 1.43±0.37 N.

Figure 9A:
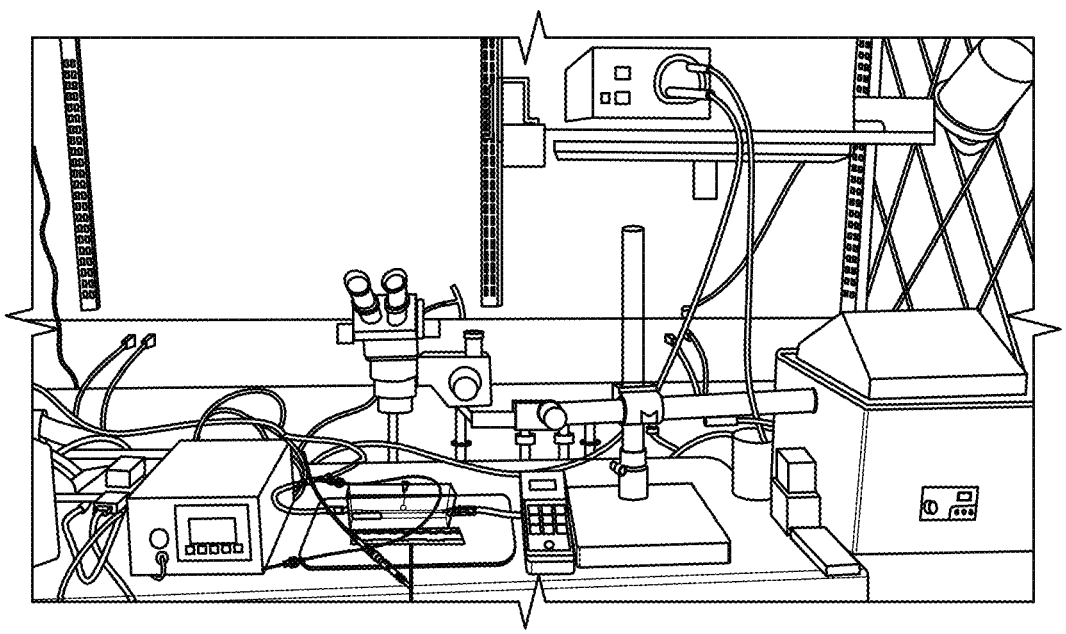
FIGS. 9(a), 9(b), 9(c), 9(d) depict setup for in vitro microcatheter delivered microgripper deliver experimental setup, 9(a) zoomed out and 9(b) zoomed in; 9(c) photographs of in vitro actuation of microcatheter delivered device deployed in the experimental setup shown in 9(a) and 9(b); 9(d) high-resolution microscope images of microgripper device at 25° C. in water.
Figure 9B:
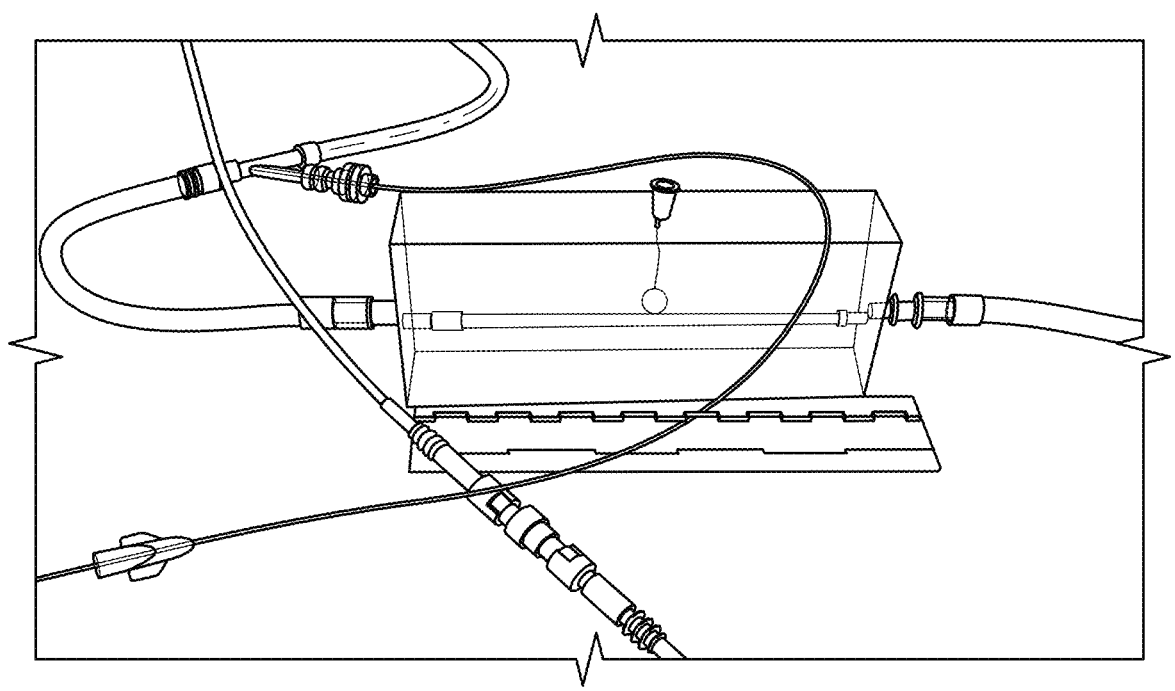
Figure 9C:
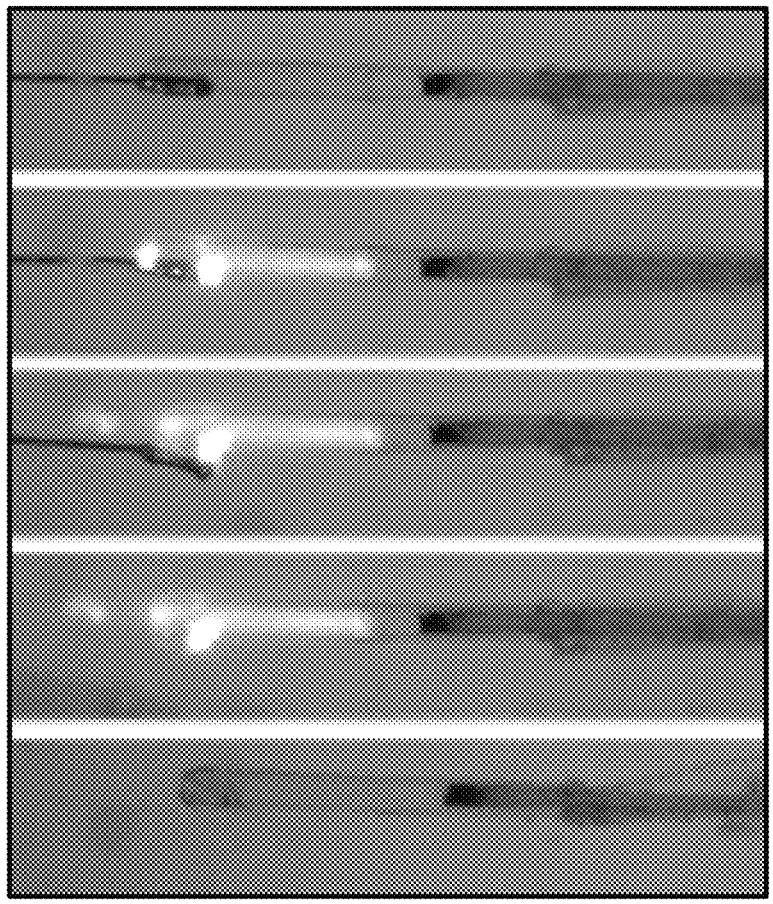
Figure 9D:
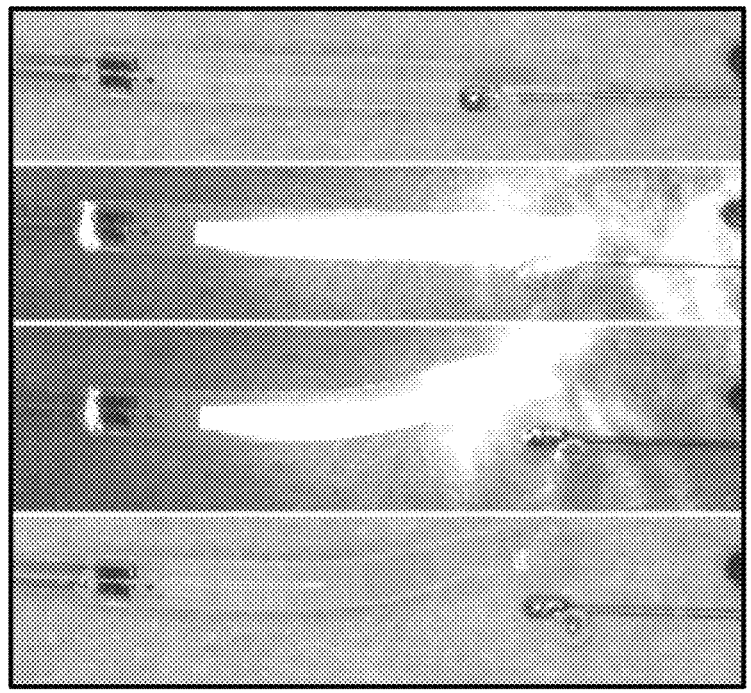
Figure 11A:
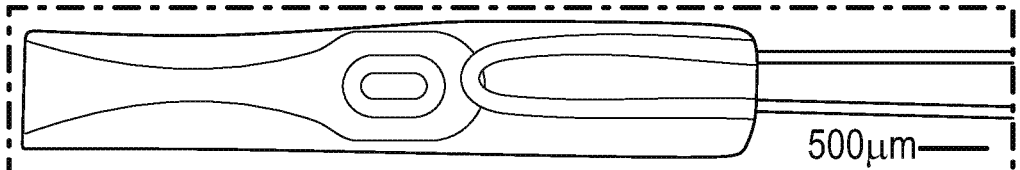
FIGS. 11(A), 11(B), 11(C), 11(D) depict 11(A) an implant side of a release mechanism, 11(B) the programmed SMP tube is placed over the heating coil of the release mechanism, 11(C) the final junction between the implant and heating coil after crimping the SMP tube, and 11(D) the proximal end of the device.
Figure 11B:
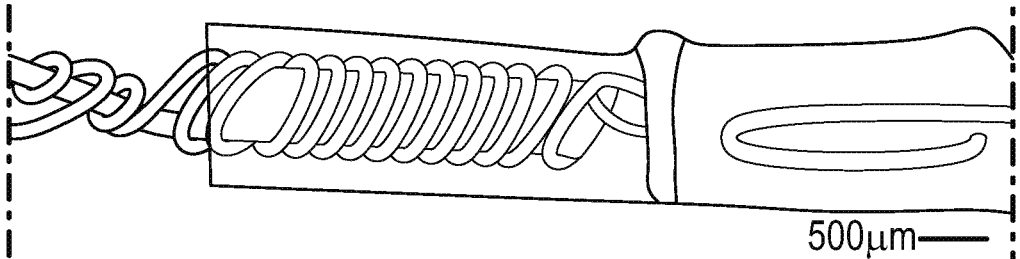
Figure 11C:
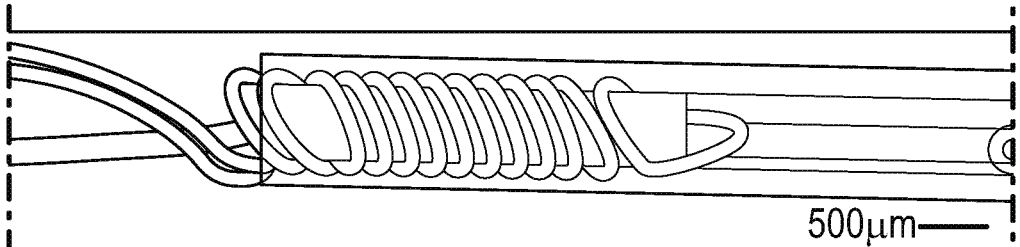
Figure 11D:
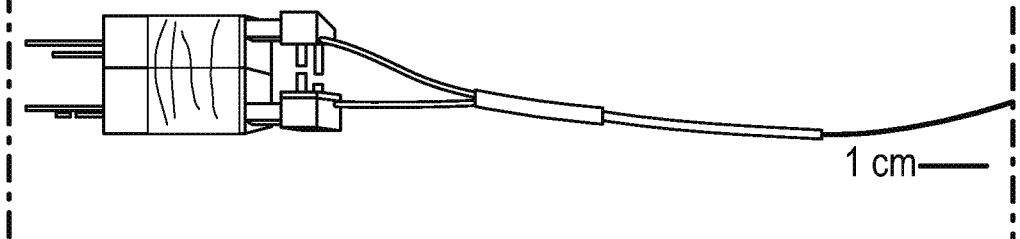

FIGS. 9(a) and 9(b) show the experimental setup for the PDMS vascular model that was used for in vitro microcatheter delivery experiments. To actuate the gripper, the device was irradiated with 3.1 W through the optical fiber using an 808 nm diode laser (Jenoptik AG, Jena, Germany), and FIG. 9(c) shows images of a successful in vitro device deployment triggered by laser actuation through a fiber optic cable run through a microcatheter. The in vitro measurements were carried out within a flow loop held at 37° C. using a flow rate of 192 mL/min. This experiment was repeated five times and resulted in successful release each time. FIG. 9(d) shows higher-resolution images of the laser-induced actuation of the SMP microgripper in 25° C. aqueous conditions without flow, which were taken using an optical microscope.

In the embodiment in which the SMP is formed as a tube, during release, the heated SMP tube recovers to its primary shape by expanding radially and retracting axially. This shape change causes detachment by removing interference between the heating coil and SMP tube components. The time lapsed images and temperature response profile in FIG. 10 show a successful device actuation in 23° C. water.

Full actuation was observed within 2 seconds, but power was applied for an additional 3 seconds to ensure complete release. The implant was pulled away from the heater at point D of the temperature response profile. Upon removal, the heater was undisturbed, indicating complete release. It is important to note that the feedback temperature never exceeded the SMP Tg, but numerous tests concluded that a feedback temperature of at least 55° C. resulted in adequate device actuation. Although there is an apparent discrepancy between the feedback temperature and the temperature experienced by the SMP, the thermocouple output is still useful feedback for the user in that it can be standardized with comprehensive testing.

FIG. 10(f) summarizes all testing results. The reported tensile strength values can serve as a guideline when developing devices delivered with this release mechanism. The diameter of the current design was functional for our tests, but will ultimately need to be miniaturized to accommodate the majority of commercially available catheters. Using smaller thermocouple leads and nichrome wire could result in ideal device dimensions without requiring significant changes to manufacturing techniques.

Release failures at 23° C. were due to incomplete actuation of the SMP tube at the distal tip of the heater when the thermocouple junction extended too far into the SMP tube. This extension left a small amount of interference during release because the amount of heat conducted through the welded junction is not sufficient to cause SMP actuation at the distal tip. Consistent manufacturing that properly places the thermocouple junction can address this issue.

3. DISCUSSION

Embodiments reported herein concern materials engineering, biomedical materials, and medical devices. From a materials engineering standpoint, the objectives of developing a new SMP system exhibiting high toughness, tunable glass transition and crosslink density and good shape memory behavior that also possesses post-polymerization crosslinking capability in atmospheric conditions were successful. Thermomechanical characterization experiments demonstrated actuation temperatures (glass transitions) that were tunable over the range of 38 to 70° C. and 56 to 105° C. by varying diol and diisocyanate monomer constituents, respectively (See FIGS. 6(a), 6(b), 6(c), 6(d)). For the varying diol co-monomer series, rubbery modulus was shown to be tunable over the order-of-magnitude range of approximately 0.4 to 10.4 MPa by varying a number of synthetic factors, and the ability to manipulate crosslink density in embodiments of this newly reported SMP system was shown to be a successful approach to tailoring recovery stress using constrained recovery shape memory characterization experiments. The DMA data in FIGS. 2(b), 2(d) and 2(f) demonstrate that, for a single thermoplastic formulation, rubbery modulus can be tailored over a roughly order-of-magnitude range by varying the synthetic conditions of C=C to SH ratio, solvent composition at curing time and polythiol additive functionality, respectively. The ability to achieve a variety of material properties upon crosslinking of a single thermoplastic formulation is a synthetic advantage of this versatile polyurethane SMP system, as it provides synthetic flexibility at the materials engineering level to the process of medical device fabrication. It is important to note, however, that in the case of the materials whose thermomechanical data are shown in FIG. 5(e), the ability to control crosslink density by varying solvent composition at curing time may occur because solvent dilution of reactants decreases conversion of reactive species and effectively causes unreacted thiols to remain in the final crosslinked materials. An embodiment uses solvent dilution as a means of tailoring mechanical properties.

From a biomedical materials development standpoint, the cell viability data shown in FIG. 7(d) provide evidence of the biocompatibility of multiple formulations in the reported SMP system. The three formulations subjected to mouse 3T3 fibroblast cell viability studies are comprised of polymer formulations whose compositions vary over the range of 0.05, 0.30 and 0.70 C=C units per polymer repeat unit that are crosslinked using 1:1 SH to C=C ratios. As the DMA data in FIG. 5(a) show, these three formulations constitute a rubbery modulus variation of 0.4 to 8.9 MPa, and each chemical formulation utilized to achieve this variation in crosslink density is shown to exhibit a cell viability greater than 90% in direct contact studies with mouse 3T3 fibroblasts. These findings indicate the three SMP formulations are non-cytotoxic to this line of mammalian cells over the course of 72 hour exposure and consequently provide evidence that this class of SMPs may be a material system for use in the fabrication of medical devices designed for implantation in the body.

Concerning the significance of the laser actuated SMP-based microgripper device reported herein within the broader scope of laser-actuated SMP devices reported in the literature, a number of laser activated SMP-based medical device prototypes have been reported, including SMP stents, mechanical thrombectomy devices, diffusers and embolic foams. The microgripper device prototype reported in this study is designed to facilitate minimally invasive delivery and release of embolic coils for treating aneurysms and is modeled after the SMP microgripper reported by Maitland and co-workers in 2002. One motivation for developing a new microgripper is to provide improved and more efficient routes to delivery of aneurysm occlusion devices. Guglielmi detachable coils (GDCs), the clinical standard for embolic treatment of aneurysms, utilize electrolytically cleavable polymer bridges to detach metal coils from delivery cables. The detachment process for a single GDC coil may take 1 to 5 minutes or longer, and up to 20 coils may be necessary to occlude an aneurysm. Prolonged treatment times may increase a number of risk factors for patients, including increased exposure to ionizing radiation. Both the Maitland 2002 SMP microgripper and the SMP microgripper reported in this study exhibit release times of 10 seconds or less and consequently offer advantages in delivery times in comparison with those of GDC coils.

In comparison with the Maitland 2002 microgripper, the device in this study possesses a number of advantages, including ease of fabrication. The 2002 device required etching the cladding off an optical fiber using hydrofluoric acid, dip-coating the etched fiber in an epoxy resin, bead blasting the epoxy to make a diffuse surface and attaching an SMP tube over the epoxy. These steps were required in order to increase the coupling efficiency of the light into the SMP tube. In contrast, the microgripper in this study requires fewer and more facile steps to fabricate. By casting the polymer directly over the SMP tip, laser radiation is coupled directly into the gripper, and additional techniques are not required to guide light into the SMP. In a similar manner to that of the 2002 device, because the index of refraction of the polymer is higher than that of water, light is guided through the SMP to the distal tip where the nitinol ball is crimped. In order to enable laser-induced heating and actuation of the SMPs in each microgripper under flow conditions, the SMPs were doped with a laser absorbing dye. For various embodiments reported herein, incorporation of light absorbing dye is achieved by solution blending with thermoplastic precursors and crosslinking additives prior to crosslinking. Solution blending in the manner reported herein affords homogeneous distribution of functional additives such as light absorbing dye particles, and homogeneous distribution enables a homogenous heating throughout the volume of the device upon laser irradiation. Other functional additive blending techniques such as solvent swelling into a network matrix or thermoplastic melt blending afford less uniform additive dispersion. While both the Maitland 2002 and present study microgripper devices utilize solution blending to disperse light absorbing dye particles throughout thermoplastic polymer chains, the device in this study is subjected to an additional post-polymerization crosslinking step after dye blending. Covalent crosslinking fixes dispersed additive positions in polymer matrices and reduces dispersed particle rearrangements associated with thermoplastic polymer mobility. From a material performance standpoint, covalent crosslinking often enables more high integrity shape memory behavior than physical crosslinking because covalent crosslinking sites constitute more permanent netpoints than physical crosslinks. The device in this study exhibits better shape fixity and shape recovery over a prolonged storage time in a programmed geometry than the 2002 device. For SMP materials used to fabricate "off-the-shelf" medical devices that may be stored for months or years before use, maintaining integrity of shape memory behavior over an extended time frame is a key material design criterion.

4. CONCLUSIONS

Embodiments addressed herein show notable developments in the fields of shape memory polymers and thiol-ene polymers research that together portray embodiments of polymer system as a material system for biomedical engineering and other applications. In comparison with other shape memory polymer systems that have been reported, the thiol-ene crosslinked polyurethane SMP system embodiments reported herein offer a unique blend of material attributes including high toughness, tunable and narrow glass transitions, tunable shape memory behavior and suitability for processing in atmospheric conditions. In comparison with a number of previously reported thiol-ene polymers, this polyurethane/poly(thioether) hybrid exhibits higher glass transitions and lower crosslink densities, which are achieved using a post-polymerization crosslinking synthetic approach that also enables thermoplastic urethane/polythiol blends to be processed into desired geometries in atmospheric conditions. Good biocompatibility was also observed in preliminary cell viability studies, and together these mechanical attributes, material processing capabilities and biocompatibility results support that embodiments of polymer systems addressed herein may serve as a platform SMP system for medical device applications as well as other applications. The feasibility of implementing embodiments in a medical device was demonstrated via the fabrication of an embolic coil microgripper release system used in the treatment of cerebral aneurysms, and the facile device fabrication process for this microgripper device indicates that this material system may be suitable for fabricating other medical devices.

5. EXPERIMENTAL SECTION

5.1. Materials

To provide a monomer-based synthetic approach to tailoring crosslink density in the thiol-ene crosslinked PU SMP system in this study, the alkene diol trimethylolpropane allyl ether (TMPAE, >98%) and the end-capping agent allyl alcohol (AA, >99%) were purchased from Sigma Aldrich Corporation. To tailor glass transition by varying aliphatic diol co-monomer, diethylene glycol (DEG, >99%), 3-methyl-pentanediol (3-MPD, >99%), 1,4-butanediol (1,4-BD, >99%), 2-methylpropanediol (2-MPD, >99%), 2,2'-dimethylpropanediol (2,2-DMPD, >99%), and 1,4-cyclohexanedimethanol, mixture of cis and trans (CHDM, >99%) were purchased from Sigma Aldrich Corporation. To tailor glass transition by varying diisocyanate monomer composition, hexamethylene diisocyanate (HDI, >98%), trimethylhexamethylene diisocyanate (TMHDI, >97%), and dicyclohexylmethane 4,4'-diisocyanate (DCHMDI, >90%) were purchased from TCI America. To absorb water during polyurethane polymerizations, 4 Å molecular sieves were purchased from Sigma Aldrich and added to polymerization mixtures. The catalyst zirconium (IV) acetylacetonate (Zr Cat, >99%), which has been shown to favor urethane formation over urea formation when water is present during urethane polymerizations, was purchased from Alfa Aesar and used in thermoplastic polyurethane synthesis. Anhydrous tetrahydrofuran (THF, >99.98%) was purchased from EMD Chemicals and used as a polymerization and blending solvent. The polythiol crosslinking agents ethylene glycol bis(3-mercaptopropionate) (EGBMP, >97%) and dipentaerythritol hexakis(3-mercaptopropionate) (DPHMP, >97%) were purchased from Wako Chemicals, and trimethylolpropane tris(3-mercaptopropionate) (TMPTMP, >95%), tris[2-(3-mercaptopropionyloxy)ethyl] isocyanurate (3TI, >95%), and pentaerythritol tetrakis(3-mercaptopropionate) (PETMP, >95%), as well as the photoinitiator 2,2'-dimethoxy-2-phenylacetophenone (DMPA) were purchased from Sigma Aldrich. All monomers, solvents, additives, catalysts, and crosslinking agents were purchased from the specified distributors and used as received without further purification. For microgripper device fabrication, Epolight™ 4121 platinum dye was purchased from Epolin, Inc., and 200/220/240 μm core/cladding/buffer optical fiber was purchased from Polymicro Technologies (FVP200220240).

5.2. Thermoplastic Polyurethane Synthesis, Purification and Solvent Removal

Formulations for all thermoplastic polyurethanes synthesized in this study are provided in FIG. 3. Each thermoplastic polyurethane formulation was synthesized in a 100 g scale polymerization batch in a 0.40 g/mL solution in anhydrous THF in a previously flame dried 240 mL glass jar in the presence of approximately 80 mL of 4 Å molecular sieves, which were also previously flame dried. All monomers, solvents and catalysts were mixed under dry air in a LabConco glove box. Using a 1.02:1.00 NCO:OH ratio, all diisocyanate and hydroxyl starting materials were added to the molecular sieve-containing glass jars in the glove box, after which anhydrous THF and the Zr catalyst (0.010 overall wt % Zr Cat) were added. The polymerizations were carried out in sealed jars using a LabConco RapidVap instrument at 80° C. for 24 h at a vortex setting of 150 RPM. The RapidVap was used to heat and mix the monomer solutions. After 24 h, the viscous polymer solutions were diluted with additional THF to afford 0.10 g/mL concentrations and filtered to remove molecular sieve particulates, residual monomers and catalyst using a 15 cm tall, 10 cm diameter flash chromatography silica column. After filtration, the purified, diluted polymer solutions were decanted into 30 cm×22 cm rectangular polypropylene (PP) dishes for solvent removal. The solution-containing PP dishes were heated in a vacuum oven to 50° C. at ambient pressure using a house air purge for 24 h, after which the oven temperature was increased to 80° C. for an additional 24 h. The vacuum oven was then evacuated to a pressure of 1 torr at 80° C. for 72 h, after which neat, amorphous, thermoplastic polyurethane films approximately 0.5 mm in thickness were removed from the PP dishes and stored under desiccation until future use.

5.3. Characterization of Thermoplastic Molecular Weight by Gel Permeation Chromatography To determine the molecular weights of all thermoplastic polyurethane formulations, gel permeation chromatography (GPC) experiments were performed on a Waters Chromatography, Inc., 1515 isocratic HPLC pump equipped with an inline degasser, a model PD2020 dual angle (15° and 90°) light scattering detector, a model 2414 differential refractometer (Waters, Inc.), and four PLgel polystyrene-co-divinylbenzene gel columns (Polymer Laboratories, Inc.) connected in series: 5 μm Guard (50×7.5 mm), 5 μm MixedC (300×7.5 mm), 5 μm 104 (300×7.5 mm), and 5 μm 500 Å (300×7.5 mm) using the Breeze (version 3.30, Waters, Inc.) software. The instrument was operated at 35° C. with THF as eluent (flow rate set to 1.0 mL/min). Data collection was performed with Precision Acquire 32 Acquisition program (Precision Detectors, Inc.) and analyses were carried out using Discovery32 software (Precision Detectors, Inc.). A system calibration curve generated from plotting molecular weight as a function of retention time for a series of broad polydispersity poly(styrene) standards was used to determine the molecular weight values.

5.4. Polythiol and Photoinitiator Solution Blending, Film Casting and Sample Curing To prepare blended mixtures of thermoplastic polyurethane, polythiol and photoinitiatior to be subjected to UV curing, approximately 5 g of each thermoplastic PU formulation were dissolved in THF solutions in 40 mL amber glass vials to afford solutions of approximately 0.13 g/mL concentrations. Polythiol crosslinking agents and photoinitiator were then added to each solution in specified quantities. Unless otherwise stated, a 1:1 C=C to SH stoichiometric ratio, a 3.0 wt % DMPA photoinitiator additive composition, a post cure time of 24 h, less than 4 wt % THF solvent at cure, and TMPTMP polythiol selection were used. After pouring the mixtures into 10 cm×5 cm×5 cm PP containers, the THF was evaporated by placing the PP containers in a vacuum oven at 50° C. at ambient pressure using a house air purge for 24 h for all series except for the varying THF series, for which THF evaporation times were varied to afford the specified THF compositions. Percent THF at curing time was determined by taking the masses of the PP containers before and after pouring the blended solutions into them and again after THF evaporation. All thiol-ene blends were irradiated using 365 nm UV light in a UVP CL-1000 L crosslinking chamber for 45 min, and after UV curing, all samples were post-cured at 120° C. at 1 torr for 24 h, except for samples in the varying post cure time series, for which post cure time was varied as specified. For the varying C=C to SH stoichiometric ratio series, C=C to SH ratios of 4.0:1.0, 2.0:1.0, 1.5:1.0, and 1.0:1.0 were used. For the varying photoinitiator composition series, DMPA compositions of 0.1, 0.5, 1.0, 3.0, and 10.0 wt % were used. For the varying post-cure time series, post cure times of 0 min, 10 min, 1.5 h, 6 h, and 24 h were used. For the varying THF at cure series, THF compositions of 300, 100, 50, 25, and <4 wt % at cure were used. For the varying polythiol functionality series, EGBMP, TMPTMP, PETMP, and DPHMP were used ($f$=2, 3, 4, and 6, respectively). For the varying diol co-monomer and varying diisocyanate co-monomer ratio $T_g$ variation series, 3TI and PETMP polythiol crosslinkers were used, respectively. After post-curing, all crosslinked films were stored under desiccation until future use.

5.5. Materials Characterization Methods

To determine the percent of thermoplastic PU chains and polythiol crosslinking additives incorporated into each network after UV curing and post curing, sol/gel analysis experiments were run on select formulations. Dry, ~50 mg samples were massed in triplicate for each formulation and placed in 20 mL glass vials, after which THF was added in approximately a 150:1 solvent to polymer mass ratio. The vials were capped and vortexed at 50 RPM at 50° C. for 48 h using a LabConco RapidVap instrument. After 48 h, the solvent swollen polymer samples were removed from the THF/sol fraction solutions and placed in new 20 mL glass vials, dried at 80° C. for an additional 48 h at 1 ton and then re-massed to provide sufficient mass data to determine the gel fractions of each irradiated sample.

To determine key thermomechanical data for each sample, including rubbery moduli and glass transitions, dynamic mechanical analysis (DMA) experiments were run on every crosslinked sample synthesized in this study. Rectangular 25.0×4.0×0.4 mm specimens were machined using a Gravograph LS100 40 W $CO_2$ laser machining system using a power setting of 15, a speed setting of 12, and a pass multiplicity of n=2. Using a TA Instruments Q800 dynamic mechanical analyzer in the DMA Multifrequency/Strain mode, DMA experiments were run in tension at 1 Hz from −20 to 140° C. using a heating rate of 2° C./min, a Preload Force of 0.01 N, a Strain of 0.1%, and a Force Track of 150%. DMA results were recorded using TA Instruments QSeries software and analyzed using TA Instruments Universal Analysis software.

To determine percent recoverable strain and recovery stress for select samples, shape memory characterization experiments were performed using a TA Instruments Q800 DMA on laser machined 25.0×4.0×0.4 mm rectangular specimens prepared using the same laser machining parameters as those used to prepare the DMA samples in the above paragraph. In the DMA Strain Rate Mode in tension, rectangular specimens were heated to $T_g$+25° C. (glass transitions were determined by the peak of the tangent deltas from the previous DMA results), allowed to equilibrate for 30 min, and then strained to deformations of 25, 50, or 100%. The strained samples were then cooled to 0° C. and allowed to equilibrate for an additional 30 min. For constrained recovery experiments, which were used to measure the recovery stress of the materials, the drive force of the DMA instrument was maintained, and the samples were heated to 120° C. at 2° C./min. For free strain recovery experiments, which were used to measure the percent recoverable strains of the SMPs, the drive force was set to zero after equilibration at 0° C., the samples were re-heated to 120° C. at 2° C./min, and the amount of recoverable deformation was recorded using TA Instruments QSeries software and analyzed using TA Instruments Universal Analysis software.

Multi-temperature strain-to-failure experiments were performed to determine ultimate tensile properties and toughness for select crosslinked samples. ASTM Type V dog bone samples were machined using a Gravograph LS100 40 W CO2 laser machining device using a power setting of 15, a speed setting of 12, and a pass multiplicity of n=2. All laser machined samples were sanded around the edges using 400, then 800, then 1200 grit sandpaper. Strain-to-failure experiments were conducted on select samples (n≥5) using an Instron Model 5965 electromechanical, screw driven test frame, which was equipped with a 500 N load cell, 1 kN high temperature pneumatic grips, and a temperature chamber that utilizes forced convection heating. An Instron Advanced Video Extensometer with a 60 mm field-of-view lens was used to optically measure the deformation of the samples by tracking parallel lines applied at the ends of the gauge length. The samples were heated to $T=T_{loss\ modulus\ peak}-10°$ C., which corresponds to a thermal state of high toughness for this polyurethane system as observed in previous experiments (loss modulus peak temperatures were determined from previously obtained DMA data). The samples were heated under zero loading, which was achieved by keeping the bottom grip unclamped during thermal equilibration. The temperature was held at the target temperature for 30 min to allow for thermal equilibrium, after which the bottom grip was clamped, and then experiments were started thereafter using a deformation rate of 10 mm/min. Data were recorded using Instron Bluehill 3 software.

To determine percent cell viability for select crosslinked samples, four 9.0×4.0×0.4 mm specimens of each sample that would be subject to cytotoxicity testing were laser cut using a Gravograph LS100 40 W $CO_2$ laser machining system using the laser cutting parameters specified in the previous paragraph. After laser machining, all specimens were washed with soap and water, rinsed with isopropanol, and then dried in a vacuum oven at 80° C. for 24 hours and subsequently subjected to EtO sterilization. For the cell culturing protocol, mouse 3T3 fibroblasts were cultured in DMEM containing 10% fetal bovine serum and 1% penicillin/streptomycin at 37° C. and 5% $CO_2$. Polymer samples were placed in 12 well plates with sterile forceps and covered with 500 μL of culture media. The cells were trypsinized, centrifuged, and re-suspended in 500 μL of culture media, after which they were placed into each well of the 12 well plate at a density of approximately 66,000 cells/cm². At 24 and 72 hour time points, culture media was aspirated from the wells, and approximately 500 μL of Calcein AM stain solution was added to each well before incubation at 37° C. and 5% $CO_2$ for 60 min. Calcein AM is a cell-permeable dye, which fluoresces green upon hydrolysis catalyzed by esterases found in the cytoplasm of living cells. Dead cells do not contain the viable esterases to catalyze this reaction and do not fluoresce green. During incubation, a 5 μM bisbenzimide (BBI, Hoechst 33258) stain solution was prepared by dilution with PBS. Before imaging, the cells were washed once with PBS, and approximately 500 μL of BBI solution was added to each well, after which the wells were covered with aluminum foil when not being imaged to limit light exposure. BBI was used as a nuclear stain, which allowed visualization of cells that did not stain with Calcein AM. In this way, live cells were counted as those fluorescing green, while dead cells were counted as those displaying nuclear BBI staining (blue) with no Calcein AM (green). Three to four replicates of each polymer formulation were imaged and analyzed as guided by ISO 10993 Part 5. Wide field fluorescence images were taken of each well at 10× magnification, and the images were analyzed using ImageJ computer software and its "Cell Counter" plug-in.

5.6. Microgripper Device Fabrication

Cylindrical Microgripper

To prepare Microgrippers, 1 g of PU was dissolved in 2 g of THF. A portion of the THF added was doped with Epolin. The amount of doped THF added was tailored to achieve the desired wt % of 0.15% of Epolin in the microgrippers. DMPA and 3TI were then added to the dissolved PU solution. Molds consisting of Rain-X coated silica capillary tubing (ID 700 um, Polymicro Technologies, Phoenix, Ariz.) and Teflon spacers used to center the optical fiber in the gripper were fabricated to achieve our desired geometry, as pictured in FIG. 8(a). Cleaved optical fiber tips were prepared (FVP200220240, Polymicro Technologies, Phoenix, Ariz.), inserted into the mold, and dissolved SMP was injected into the distal end of the mold, filling the tube and expelling any bubbles. The microgrippers were then UV crosslinked for 20 minutes and post-cured at 120° C. under vacuum overnight. In this step the solvent was removed from the polymer through evaporation and the SMP shrinked from the initial OD of 700 um to our desired OD of approximately 450 um. After post-cure, the mold was removed and the microgripper was inspected for defects, such as bubbles, improper fiber placement, or particulates within the gripper.

The crimping process for the microgripper/ball-tipped assemblies is shown in FIG. 8(b). To load the coil into the microgripper, the gripper was placed into a capillary tube with an ID slightly larger than the OD of the gripper. The gripper was then heated above its $T_g$ and the ball tip of the wire coil was axially forced into the distal end of the SMP. All of the components were then cooled to room temperature, fixing the SMP in the deformed configuration, locking in the ball tipped coil.

Resistive Heater Device Fabrication

This device is composed of two distinct parts, the heater and the implant. The heater is tipped with a nichrome wire coil wound around a T type thermocouple junction. The implant is composed of a programmed SMP tube which is epoxied to a nitinol wire "mock device." FIG. 11 depicts the anatomy of each component part of the release mechanism.

The heater portion of the device was manufactured by threading three 125 μm diameter insulated copper leads and one 125 μm insulated constantan lead through a 155 cm long, 305 μm ID, 455 μm OD Actone cable tube (Asahi Intecc, Japan). At the distal end of the device, an insulated 100 μm diameter nichrome wire doublet was wound around one copper and constantan lead, which were then laser welded together at the distal tip using an iWeld laser welder (Laserstar Technologies Corporation, Orlando, Fla.) to form a T type thermocouple junction. The remaining leads were welded, reinforced with heat shrink tubing, and instrumented with thermocouple connectors to form separate thermocouple and heating circuits.

Tubular Microgripper Device Fabrication

SMP tubes were manufactured from a proprietary post polymerization crosslinkable polyurethane chemistry. The thermoplastic polymer solution was dipcoated onto a 740 μm OD Teflon coated stainless steel mandrel (Mcmaster Carr) and subsequently crosslinked and postcured, resulting in SMP tubes with an outer diameter of 890 μm. A Q200 DSC (TA Instruments, New Castle, Del.) was used to determine the glass transition temperature of 63° C.

The secondary SMP tube geometry was programmed by heating the tubes above their transition temperature, stretching them over a 350 μm steel mandrel, and constraining them while they cooled to room temperature. This resulted in a programmed geometry that was elongated and smaller in diameter than the original tube. A 65 μm diameter nitinol wire, representing the backbone of an implantable device, was heat treated into a hairpin loop and affixed to the inside of the SMP tube section using UV curable epoxy.

To complete the release mechanism, the portion of the SMP tube protruding from the epoxy bond was crimped over the wound nichrome coil using a Machine Solutions (Flagstaff, Ariz.) SC150 heated crimping head set to 75° C. The crimper was allowed to cool to room temperature before removing the finished device.

Tubular Microgripper Device Characterization

Release device prototypes were verified via actuation in 23° C. water. An Agilent U3606A power supply was used as a constant electric current source to heat the devices. Electric currents ranging from 300 mA to 350 mA, resulting in an average power of 4 watts, were applied to provide sufficient heating for deployment, Temperature was monitored by instrumenting the thermocouple with a NI9211 DAQ module and LabView (National Instruments, Austin, Tex.).

After verification in room temperature water, the release devices were tested in a 37° C. in vitro flow loop. The devices were introduced into the system through a 500 μm ID Teflon tube mock micro catheter. The devices were deployed under a simulated common carotid peak flow rate dynamically scaled to our flow system at 226 ml/min.

Tensile strength of the release mechanism was determined using an Instron 5965 frame equipped with a 50 N load cell, pneumatic grips, and temperature chamber. Each device was equilibrated at 37° C. for 15 minutes and subsequently loaded at 1 mm/min until device failure. Tensile strength of the device was defined as the peak load force.

5.7. Cylindrical Microgripper Device Characterization

In order to provide indicative data about the gripping strength capacity of the crimped microgripper/ball-tipped assembles during microcatheter delivery of endovascular devices, the maximum gripping forces of the crimped assembles were determined using tensile testing experiments. As pictured in FIG. 8(c), these experiments were set up and run using an MTS tensile testing system. Using the immersion chamber of the MTS system, strain-to-failure experiments were carried out on seven crimped seven devices in water at 37° C. Additionally, to demonstrate proof-of-concept of successful device deployment, in vitro measurements were carried out within a flow loop held at 37° C. and using a flow rate of 190 mL/min, which is similar to flow rates seen in vivo, using the experimental setup pictured in FIGS. 6(a) and 6(b). To actuate the grippers, approximately 3.1 W of laser irradiation was delivered through the optical fiber to the gripper using an 808 nm diode laser (Jenoptik AG, Jena, Germany) for approximately five seconds. Five crimped devices were subjected to these in vitro laser-actuated deployments to test for consistent release.

References addressed above are as follows: [1] W. Small I V, P. Singhal, T. S. Wilson and D. J. Maitland. J. Mater. Chem. 2010, 20, 3356. [2] D. L. Safranski, K. E. Smith and K. Gall. Polym. Rev. 2013, 53, 76. [3] T. Ware, D. Simon, K. Hearon, C. Liu, S. Shah, J. Reeder, N. Khodaparast, M. P. Kilgard, D. J. Maitland, R. L. Rennaker and W. E. Voit. Macromol. Mater. Eng. 2012, 297, 1193. [4] K. K. Julich-Gruner, C. Löwenberg, A. T. Neffe, M. Behl and A. Lendlein. Macromol. Chem. Phys. 2013, 214, 527. [5] K. Hearon, P. Singhal, J. Horn, W. Small, C. Olsovsky, K. C. Maitland, T. S. Wilson and D. J. Maitland. Polym. Rev. 2013, 53, 41. [6] C. Yakacki and K. Gall, in Adv. Polym. Sci., 226, (A. Lendlein), Springer-Verlag, Berlin/Heidelberg, Germany, 2010, Shape-Memory Polymers for Biomedical Applications. [7] D. L. Safranski and K. Gall. Polymer 2008, 49, 4446. [8] A. Lendlein and S. Kelch. Angew. Chem. Int. Ed 2002, 41, 2035. [9] C. Liu, H. Qin and P. T. Mather. J. Mater. Chem. 2007, 17, 1543. [10] K. Hearon, S. E. Smith, C. A. Maher, T. S. Wilson and D. J. Maitland. Radiat. Phys. Chem. 2013, 83, 111. [11] K. Hearon, K. Gall, T. Ware, D. J. Maitland, J. P. Bearinger and T. S. Wilson. J. Appl. Polym. Sci. 2011, 121, 144. [12] Q. Li, H. Zhou, D. A. Wicks, C. E. Hoyle, D. H. Magers and H. R. McAlexander. Macromolecules 2009, 42, 1824. [13] J. N. Rodriguez, F. J. Clubb, T. S. Wilson, M. W. Miller, T. W. Fossum, J. Hartman, E. Tuzun, P. Singhal and D. J. Maitland. J. Biomed. Mater. Res. Part A 2013, 10.1002/jbm.a.34782. [14] U. D. Harkal, A. J. Muehlberg and D. C. Webster. Prog. Org. Coat. 2012, 73, 19.

[15] C. E. Hoyle and C. N. Bowman. Angew. Chem. Int. Ed. 2010, 49, 1540. [16] C. E. Hoyle, A. B. Lowe and C. N. Bowman. Chem. Soc. Rev. 2010, 39, 1355. [17] D. P. Nair, N. B. Cramer, T. F. Scott, C. N. Bowman and R. Shandas. Polymer 2010, 51, 4383. [18] S. Beigi, H. Yeganeh and M. Atai. Dent. Mater. 2013, 29, 777. [19] Z. Yang, D. A. Wicks, C. E. Hoyle, H. Pu, J. Yuan, D. Wan and Y. Liu. Polymer 2009, 50, 1717. [20] D. B. Otts, E. Heidenreich and M. W. Urban. Polymer 2005, 46, 8162. [21] S. E. Kasprzak, B. Martin, T. Raj and K. Gall. Polymer 2009, 50, 5549. [22]T. S. Wilson, J. P. Bearinger, J. L. Herberg, J. E. M. III, W. J. Wright, C. L. Evans and D. J. Maitland. J. Appl. Polym. Sci. 2007, 106, 540. [23] D. J. Maitland, M. F. Metzger, D. Schumann, A. Lee and T. S. Wilson. Laser Surg. Med. 2002, 30, 1. [24] K. Hearon, C. J. Besset, A. T. Lonnecker, T. Ware, W. E. Voit, T. S. Wilson, K. L. Wooley and D. J. Maitland. Macromolecules 2013, 10.1021/ma4018372.

The following examples pertain to further embodiments.

Example 1 includes a polymer composition comprising a polymer chain having shape memory properties and having crosslinkable alkene groups substantially regularly spaced along the polymer chain which, when crosslinked by thiol-ene addition with a polythiol crosslinker, forms a thermoset polymer having shape memory properties.

In example 2 the subject matter of Example 1 can optionally include wherein the resulting thermoset polymer is a poly(thioether-co-urethane).

In example 3 the subject matter of Example 1 can optionally wherein the resulting thermoset polymer is a poly(thioether-co-ester).

In example 4 the subject matter of Examples 1-3 can optionally include wherein the resulting thermoset polymer is a blend of poly(thioether-co-urethane) and poly(thioether-co-ester).

Regarding examples 2, 3, and 4, urethanes have good mechanical properties, resulting in strong devices. Polyesters enable biodegradation with a tradeoff of less mechanical integrity. Various embodiments include varying ester/urethane ratios.

In example 5 the subject matter of the Examples 1-4 can optionally include at least one monomer selected from a group consisting of Hexamethylene diisocyanate (HDI), trimethylhexamethylene diisocyanate (TMHDI), dicyclohexylmethane 4,4'-diisocyanate (DCHMDI), Isophorone diisocyanate (IPDI), 2-butene-1,4-diol (2-but), diethylene glycol (DEG), diethanolamine (DEA), 4-dimethylaminopyridine (DMAP), triethylamine (TEA), allyl alcohol (AA), trimethylolpropane allyl ether (TMPAE), 3-methyl-1,5-pentanediol (3-MPD), diethylene glycol (DEG), 3-methyl-pentanediol (3-MPD), 1,4-butanediol (1,4-BD), 2-methylpropanediol (2-MPD), 2,2'-dimethylpropanediol (2,2-DMPD), and 1,4-cyclohexanedimethanol (CHDM)'.

In an embodiment TMPAE is used for the manufacturing of the thermoplastic materials and provides a cheap, efficient way to incorporate pendant double bonds into a thermoplastic polyurethane.

An embodiment method includes beginning by making a thermoplastic, which is then used to make various device shapes, that are then crosslinked into a thermoset. Various final products (suitable for implantation into a human) include the thermoset.

In example 6 the subject matter of Examples 5 can optionally include trimethylolpropane allyl ether (TMPAE).

In example 7 the subject matter of Example 1 can optionally include trimethylolpropane allyl ether (TMPAE).

In example 8 the subject matter of the Examples 1-7 can optionally include wherein the polythiol crosslinking agent is selected from a group consisting of ethylene glycol bis(3-mercaptopropionate) (EGBMP), dipentaerythritol hexakis(3-mercaptopropionate) (DPHMP), trimethylolpropane tris(3-mercaptopropionate) (TMPTMP), tris[2-(3-mercaptopropionyloxy)ethyl] isocyanurate (3TI), and pentaerithritol tetrakis(3-mercaptopropionate) (PETMP).

In example 9 the subject matter of the Examples 1-8 can optionally include wherein the thiol-ene reaction is initiated by a UV photoinitiator.

In an embodiment residual photoinitiator is left in the end product polymer.

In example 10 the subject matter of the Examples 1-9 can optionally include the polymer composition having a glass transition temperature between 30° C. and 105° C.

In example 11 the subject matter of the Examples 1-10 can optionally include the a polymer composition having a glass transition temperature breadth of less than 20° C.

Examples 10 and 11 are detectable in final products. These examples are advantageous because a person of ordinary skill in the art will face great difficulty in obtaining narrow glass transitions on top of other properties described herein because it requires significant network homogeneity. Tg's in the listed range of 30-105 C have great utility in biomedical applications, especially since most of the Tg's will lower once they are exposed to moisture in the body. As noted in the background text, many thiol-ene networks have Tg's below 25 C, or if they are high enough for biomedical applications, they are brittle.

In example 12 the subject matter of the Examples 1-11 can optionally include wherein the polymer is fabricated into a porous structure or foam by one or a combination of processes from the group of freeze drying, high inverse phase emulsion foaming, physical blowing, pore templating utilizing a solid or liquid pore former, solution spinning, stereolithographic patterning, micro-extrusion or ink pen printing, 3D microdot based printing, laser machining, electrospinning, cryogelation, or supercritical gas foaming Example 13 includes a method of making polymeric articles having shape memory properties comprising forming a thermoplastic linear or branched linear polymer having shape memory properties, processing the polymer into a shape, curing or crosslinking the polymer so that a thermoset polymer is formed that has the device shape and forms as the permanent shape and may be made to take a stable secondary shape through the application of stress or strain at a temperature above its actuation transition, then held at the secondary shape while cooled to a temperature below its transition temperature In example 14 the subject matter of the Example 13 can optionally include wherein the thermoplastic polymer processing is chosen from a group consisting of solution casting, solution spinning, dip coating, thermoforming, compression molding, injection molding, extrusion, and film blowing In an example, data listed herein determines whether an end product was made with an embodiment of the synthetic approach (e.g., FIG. 1). For example, an end product made via FIG. 1 may be evidenced by a thioether co-urethane (detectable using FTIR) with comparable shape memory properties (e.g., Tg's within the quoted range 30-105 C, with comparably sharp transitions).

An example includes a process and synthetic approach that enables processing techniques (i.e., thermoplastic techniques) that other SMPs cannot use. In an embodiment the final product (a thermoset) has excellent mechanical properties. An example includes generic claims for end products that are included in a class of thermoset materials (poly (thioether-co-urethanes)) that are SMPs. Ranges of Tg's, transition breadths, and mechanical properties and complex shapes are possible for these thermoset devices that were previously unavailable for thermoset devices (considering thiolene materials conventionally have Tg's below the range that is useful for medical SMPs (e.g., 25 C)).

Figure 12:
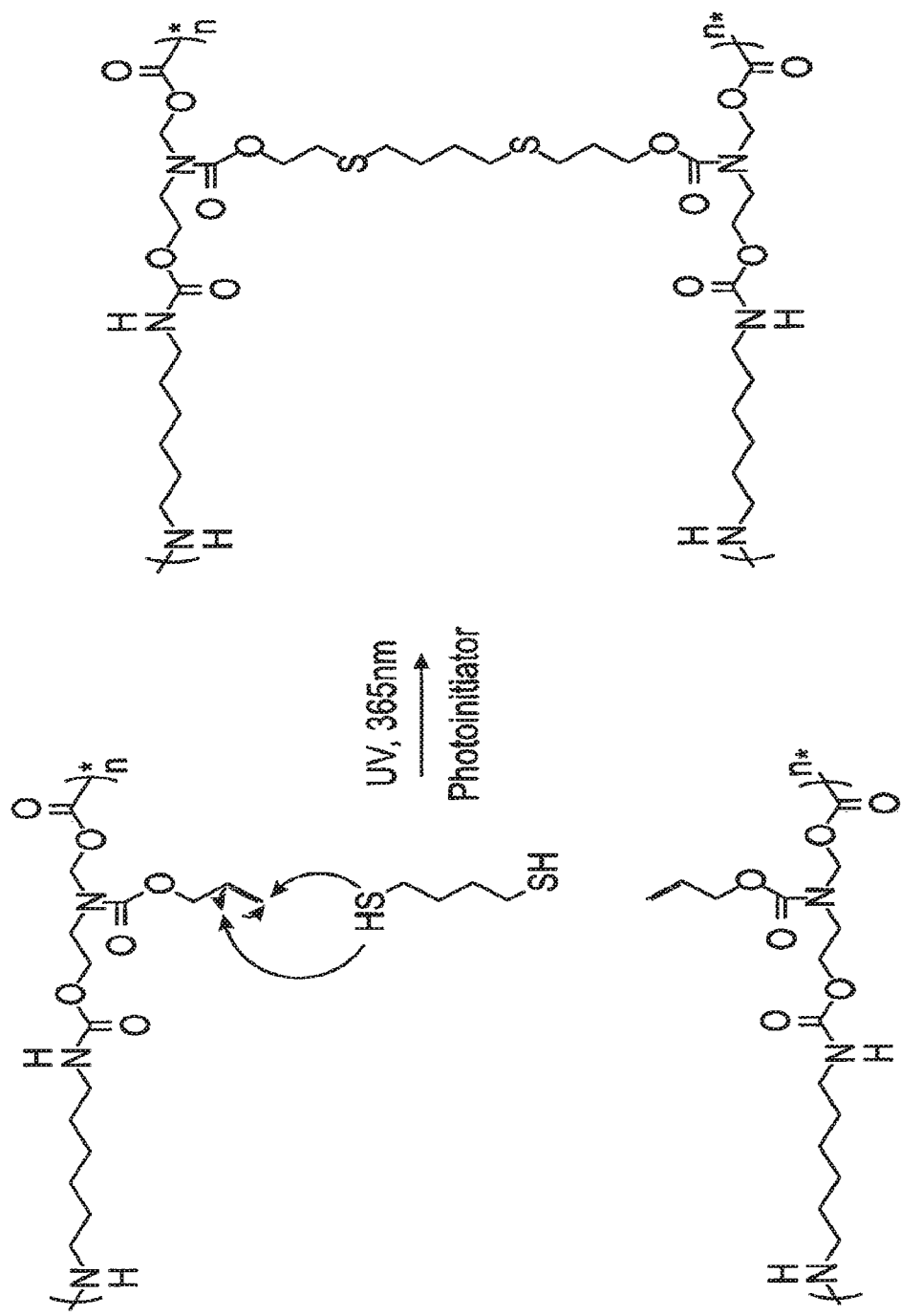
FIG. 12 includes an embodiment of a thiol-ene click reaction. The thiolene reaction may be initiated with ultraviolet radiation, e-beam radiation, or thermal initiation.

An example includes a thiol-ene click reaction shown in FIG. 12. The thiolene reaction may be initiated with e beam radiation.

Example 1' includes a thermoplastic polyurethane shape memory polymer composition, wherein the thermoplastic polyurethane shape memory polymer comprises the reaction product of (A) a polyol and (B) a diisocyanate.

In example 2' the subject matter of the Example 1' can optionally include wherein the polyol is a diol.

In example 3' the subject matter of the Examples 1'-2' can optionally include wherein the diol is a C=C diol.

In example 4' the subject matter of the Examples 1'-3' can optionally include wherein the polyol is selected from the group consisting of trimethylolpropane allyl ether, diethylene glycol, 3-methyl-pentanediol, 1,4-butane diol, 2-methyl propane diol, 1,4-cyclohexanedimethanol and combinations thereof.

In example 5' the subject matter of the Examples 1'-4' can optionally include wherein the diisocyanate is selected from the group consisting of hexamethylene diisocyanate, trimethylhexamethylene diisocyanate, and dicyclohexylmethane 4,4'-diisocyanate, and combinations thereof.

In example 6' the subject matter of the Examples 1'-5' can optionally include comprising at least one crosslinking agent.

In example 7' the subject matter of the Examples 1'-6' can optionally include wherein the crosslinking agent is a polythiol.

In example 8' the subject matter of the Examples 1'-7' can optionally include wherein the polythiol is selected from the group consisting of ethylene glycol bis(3-mercaptopropionate), dipentaerythritol hexakis(3-mercaptopropionate), trimethylolpropane tris(3-mercaptopropionate), tris[2-(3-mercaptopropionyloxy)ethyl] isocyanurate, pentaerithritol tetrakis(3-mercaptopropionate) and combinations thereof.

In example 9' the subject matter of the Examples 1'-8' can optionally include wherein the ratio of polyol to diisocyanate is approximately 1:1.

In example 10' the subject matter of the Examples 1'-9' can optionally include wherein the ratio of crosslinking agent to diol present in the polymer is 1:1.

In example 11' the subject matter of the Examples 1'-10' can optionally include one of a photoactivated chromophore that can be intrinsic to the polymer itself, an extrinsic photoactivated chromophore dopant, or thermally conductive dopant, wherein the dopant is evenly dispersed throughout the polymer.

In example 12' the subject matter of the Examples 1'-11' can optionally include wherein the dopants are selected from the group consisting of laser absorbing dyes, laser absorbing particles, optically diffusing particles or combinations thereof.

In example 13' the subject matter of the Examples 1'-12' can optionally include wherein the laser wavelength used overlaps with the absorption spectrum of the polymer.

In example 14' the subject matter of the Examples 1'-13' can optionally include wherein the shape memory polymer exhibits a thermal triggering temperature ranging from 38° C. to 105° C. by varying the polyol and diisocyanate concentrations.

Example 15' includes a method of manufacturing a thermoplastic polyurethane shape memory polymer composition, comprising the steps of: mixing a polyol monomer with a diisocyanate monomer; initiating the polymerization of the monomers to form a polymer; optionally blending the polymer with a crosslinking agent and a photoactivated or thermally conductive dopant; irradiating the blended polymer with UV light to initiate crosslinking; and curing the crosslinked polymer.

In example 16' the subject matter of the Example 15' can optionally include wherein the thermoplastic polyurethane shape memory polymer composition is formed into a cylinder on a tip of an endovascular device or actuating device.

In example 17' the subject matter of the Example 15'-16' can optionally include wherein the actuating device is an optical fiber, a fiber optic diffuser, or a resistive heater.

In example 18' the subject matter of the Examples 15-17' can optionally include wherein the thermoplastic polyurethane shape memory polymer composition is formed into a tube.

In example 19' the subject matter of the Examples 15'-18' can optionally include wherein the tube is set into an elongated secondary shaped form.

In example 20' the subject matter of the Examples 15'-19 can optionally include wherein the elongated shaped form is attached to a tip of an endovascular device or an actuating device.

Example 21' includes a method of delivering an endovascular device using a microactuator, comprising the steps of: axially crimping the endovascular device or actuating device into the microactuator or crimping the endovascular device into the microactuator sidewall; transporting the crimped components to an area of need in a subject; activating the dopant to heat the microactuator and cause a change in the shape of the microactuator; and releasing the device from the microactuator as a result of the change of the shape of the microactuator.

Example 22' includes a method of delivering an endovascular device using a microactuator, comprising the steps of: inserting an activating or endovascular device into the microactuator lumen; radially crimping the microactuator, fixing the device within the lumen in place; transporting the crimped components to an area of need in a subject; activating the dopant to heat the microactuator to cause a change in the shape of the microactuator; and releasing the device from the microactuator as a result of the change of the shape of the microactuator.

In example 23' the subject matter of the Examples 21'-22' can optionally include wherein the crosslinked thermoplastic shape memory polymer microactuator or dopant is activated by laser radiation.

In example 24 the subject matter of the Examples 21-23 can optionally include wherein the crosslinked thermoplastic shape memory polymer microactuator or dopant is activated by conductive heating from a resistive heater.

The resistive heater may be composed of a high resistance wire wound around a core wire(s) at a specified pitch and spacing wound as: a resistive wire doublet or a single resistive wire grounded to the core wire. In an embodiment the inner core in which the resistive wire(s) are wound around consists of one or multiple wires. The core wires can incorporate insulated thermocouple leads, with the thermocouple junction located at the distal end of the core or at a specified point along the axial length.

In example 24' the subject matter of the Examples 21'-24' can optionally include cutting a hole between the activating and endovascular devices to minimize the risk of air embolization.

Example 1a includes a polymer composition comprising: crosslinkable alkene groups substantially regularly spaced along a polymer chain; and a polythiol crosslinker; wherein the composition is a thermoplastic and is configured so crosslinking the alkene groups with the polythiol crosslinker via a thiol-ene reaction forms a thermoset polymer having shape memory properties.

In example 2a the subject matter of Example 1a can optionally include wherein the thermoset polymer is a poly(thioether-co-urethane).

In example 3a the subject matter of Examples 1a-2a can optionally include wherein the thermoset polymer is a poly(thioether-co-ester).

In example 4a the subject matter of Examples 1a-3a can optionally include wherein the thermoset polymer includes poly(thioether-co-urethane) and poly(thioether-co-ester).

In example 5a the subject matter of Examples 1a-4a can optionally include at least one monomer selected from a group consisting of Hexamethylene diisocyanate (HDI), trimethylhexamethylene diisocyanate (TMHDI), dicyclohexylmethane 4,4'-diisocyanate (DCHMDI), Isophorone diisocyanate (IPDI), 2-butene-1,4-diol (2-but), diethylene glycol (DEG), diethanolamine (DEA), 4-dimethylaminopyridine (DMAP), triethylamine (TEA), allyl alcohol (AA), trimethylolpropane allyl ether (TMPAE), 3-methyl-1,5-pentanediol (3-MPD), diethylene glycol (DEG), 3-methyl-pentanediol (3-MPD), 1,4-butanediol (1,4-BD), 2-methylpropanediol (2-MPD), 2,2'-dimethylpropanediol (2,2-DMPD), and 1,4-cyclohexanedimethanol (CHDM), and combinations thereof.

In example 6a the subject matter of Examples 1a-5a can optionally include trimethylolpropane allyl ether (TMPAE).

In example 7a the subject matter of Examples 1a-6a can optionally include wherein the polythiol crosslinker is selected from a group consisting of ethylene glycol bis(3-mercaptopropionate) (EGBMP), dipentaerythritol hexakis (3-mercaptopropionate) (DPHMP), trimethylolpropane tris (3-mercaptopropionate) (TMPTMP), tris[2-(3-mercaptopropionyloxy)ethyl] isocyanurate (3TI), and pentaerithritol tetrakis(3-mercaptopropionate) (PETMP), and combinations thereof.

In example 8a the subject matter of Examples 1a-7a can optionally include an initiator including at least one of a UV photoinitiator or thermal initiator, wherein the initiator is configured to initiate a thiol-ene reaction that forms the thermoset polymer.

Example 9a includes a method of manufacturing a polyurethane shape memory polymer composition, comprising the steps of: mixing a polyol monomer with a diisocyanate monomer; initiating polymerization of the polyol and diisocyanate monomers to form a thermoplastic polymer; blending the polymer with a polythiol crosslinking agent and initiator dopant; initiate crosslinking of the polymer, with at least one of light and heat, to form a crosslinked polymer; and curing the crosslinked polymer to form a thermoset polymer.

In example 10a the subject matter of Example 9a can optionally include fabricating the thermoset polymer into a porous structure by one or more processes from the group comprising: freeze drying, high inverse phase emulsion foaming, physical blowing, pore templating utilizing a solid or liquid pore former, solution spinning, stereolithographic patterning, micro-extrusion or ink pen printing, 3D microdot based printing, laser machining, electrospinning, cryogelation, and supercritical gas foaming.

In example 11a the subject matter of Examples 9a-10a can optionally include wherein the dopant is at least one of photoactivated and thermally initiated and the method comprises irradiating the blended polymer with UV light or heating to form the crosslinked polymer.

In example 12a the subject matter of Examples 9a-11a can optionally include processing the thermoplastic polymer using a method selected from the group consisting of: solution casting, solution spinning, dip coating, thermoforming, compression molding, injection molding, extrusion, and film blowing.

Example 13a includes an apparatus comprising: a thiol-ene cross-linked thermoset shape memory polymer (SMP) comprising at least one of a poly(thioether-co-urethane) and a poly(thioether-co-ester); wherein the SMP includes a proximal portion, a distal portion, and a middle portion coupling the proximal portion to the distal portion; wherein the SMP comprises a first additive uniformly distributed among the proximal, middle, and distal portions.

In example 14a the subject matter of Example 13 can optionally include wherein the first additive includes at least one of a photo-initiator and a thermal-initiator.

In example 15a the subject matter of Examples 13a-14a can optionally include wherein the SMP comprises a second additive uniformly distributed among the proximal, middle, and distal portions and the second additive includes at least one of a laser absorbing dye, a laser absorbing particle, an optically diffusing particle, a radiopaque particle, a protein, and a therapeutic agent.

In example 16a the subject matter of Examples 14a-15a can optionally include wherein: the first additive is uniformly present in the proximal portion at a first concentration, in the middle portion at a second concentration, and in the distal portion at a third concentration; and the first, second, and third concentrations are generally equal to each other.

In example 17a the subject matter of Examples 13a-16a can optionally include wherein the first additive includes at least one of a laser absorbing dye, a laser absorbing particle, and an optically diffusing particle.

In example 18a the subject matter of Examples 13a-17a can optionally include wherein the SMP has a tunable glass transition (Tg).

In example 19a the subject matter of Examples 13a-18a can optionally include wherein the SMP comprises the poly(thioether-co-urethane) but not the poly(thioether-co-ester).

In example 20a the subject matter of Examples 13a-19a can optionally include wherein the SMP comprises the poly(thioether-co-ester) but not the poly(thioether-co-urethane).

In example 21a the subject matter of Examples 13a-20a can optionally include wherein the SMP comprises the poly(thioether-co-urethane) and the poly(thioether-co-ester).

In example 22a the subject matter of Examples 13a-21a can optionally include wherein the SMP is covalently cross-linked.

While at times herein embodiments of SMPs are used in biomedical applications, such embodiments are not so limited and may be included in various applications include, without limitation, aerospace applications and the like where the SMPs are used for shock absorption, insulation, deployable structures, temperature indicators/thermal switches, and the like.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. A polymer composition comprising:
   a thermoplastic polymer comprising crosslinkable alkene groups spaced along a polymer chain;
   a polythiol crosslinker; and
   an initiator including at least one of a UV photoinitiator, a thermal initiator, or combinations thereof;
   wherein (a) the thermoplastic polymer is configured so crosslinking the alkene groups with the polythiol crosslinker via a thiol-ene reaction forms a thermoset polymer having shape memory properties; (b) the alkene groups are derived from trimethylolpropane allyl ether (TMPAE), and (c) the initiator is configured to initiate the thiol-ene reaction to form the thermoset polymer.

2. The polymer composition of claim 1 wherein the thermoset polymer is a poly(thioether-co-urethane).

3. The polymer composition of claim 1 wherein the thermoset polymer is a poly(thioether-co-ester).

4. The polymer composition of claim 1 wherein the initiator includes the UV photoinitiator.

5. The polymer composition of claim 1 wherein the polythiol crosslinker includes at least one of ethylene glycol bis(3-mercaptopropionate) (EGBMP), dipentaerythritol hexakis(3-mercaptopropionate) (D PHMP), tris[2-(3-mercaptopropionyloxy)ethyl] isocyanurate (3TI), pentaerythritol tetrakis(3-mercaptopropionate) (PETMP), or combinations thereof.

6. The polymer composition of claim 5 wherein:
   the thermoset polymer includes a poly(thioether-co-ester); and
   the initiator includes the UV photoinitiator.

7. The polymer composition of claim 6, wherein the thermoplastic polymer is derived from at least one of Hexamethylene diisocyanate (HDI), trimethylhexamethylene diisocyanate (TMHDI), dicyclohexylmethane 4,4'-diisocyanate (DCHMDI), Isophorone diisocyanate (IPDI), 2-butene-1,4-diol (2-but), diethylene glycol (DEG), diethanolamine (DEA), 4-dimethylaminopyridine (DMAP), triethylamine (TEA), allyl alcohol (AA), 3-methyl-1,5-pentanediol (3-MPD), diethylene glycol (DEG), 3 methylpentanediol (3-MPD), 1,4-butanediol (1,4-BD), 2-methylpropanediol (2-MPD), 2,2'-dimethylpropanediol (2,2-DMPD), 1,4-cyclohexanedimethanol (CHDM), or combinations thereof.

8. A polymer composition comprising:
   a thermoplastic polymer comprising crosslinkable alkene groups spaced along a polymer chain;
   a polythiol crosslinker; and
   an initiator including at least one of a UV photoinitiator, a thermal initiator, or combinations thereof;
   wherein (a) the thermoplastic polymer is configured so crosslinking the alkene groups with the polythiol crosslinker via a thiol-ene reaction forms a thermoset polymer having shape memory properties; (b) the alkene groups are a reaction product of trimethylolpropane allyl ether (TMPAE), and (c) the initiator is configured to initiate the thiol-ene reaction to form the thermoset polymer.

9. The polymer composition of claim 8 wherein the thermoset polymer is a poly(thioether-co-urethane).

10. The polymer composition of claim 8 wherein the thermoset polymer is a poly(thioether-co-ester).

11. The polymer composition of claim 8 wherein the initiator includes the UV photoinitiator.

12. The polymer composition of claim 8 wherein the polythiol crosslinker includes at least one of ethylene glycol bis(3-mercaptopropionate) (EGBMP), dipentaerythritol hexakis(3-mercaptopropionate) (D PHMP), tris[2-(3-mercaptopropionyloxy)ethyl] isocyanurate (3TI), pentaerythritol tetrakis(3-mercaptopropionate) (PETMP), or combinations thereof.

13. The polymer composition of claim 12 wherein:
   the thermoset polymer includes a poly(thioether-co-ester); and
   the initiator includes the UV photoinitiator.

14. The polymer composition of claim 13, wherein the thermoplastic polymer is a reaction product of at least one of Hexamethylene diisocyanate (HDI), trimethylhexamethylene diisocyanate (TMHDI), dicyclohexylmethane 4,4'-diisocyanate (DCHMDI), Isophorone diisocyanate (IPDI), 2-butene-1,4-diol (2-but), diethylene glycol (DEG), diethanolamine (DEA), 4-dimethylaminopyridine (DMAP), triethylamine (TEA), allyl alcohol (AA), 3-methyl-1,5-pentanediol (3-MPD), diethylene glycol (DEG), 3 methylpentanediol (3-MPD), 1,4-butanediol (1,4-BD), 2-methylpropanediol (2-MPD), 2,2'-dimethylpropanediol (2,2-DMPD), 1,4-cyclohexanedimethanol (CHDM), or combinations thereof.

15. A polymer composition comprising:
   a polyurethane thermoplastic polymer comprising crosslinkable alkene groups spaced along a polymer chain;
   a polythiol crosslinker; and
   an initiator including at least one of a UV photoinitiator, a thermal initiator, or combinations thereof;
   wherein (a) the thermoplastic polymer is configured so crosslinking the alkene groups with the polythiol crosslinker via a thiol-ene reaction forms a thermoset polymer having shape memory properties; (b) the thermoplastic polymer includes a pendant allyl ether group, and (c) the initiator is configured to initiate the thiol-ene reaction to form the thermoset polymer.

16. The polymer composition of claim 15 wherein the thermoset polymer is a poly(thioether-co-urethane).

17. The polymer composition of claim 15 wherein the thermoset polymer is a poly(thioether-co-ester).

18. The polymer composition of claim 15 wherein the initiator includes the UV photoinitiator.

19. The polymer composition of claim 15 wherein the polythiol crosslinker includes at least one of ethylene glycol bis(3-mercaptopropionate) (EGBMP), dipentaerythritol hexakis(3-mercaptopropionate) (D PHMP), tris[2-(3-mercaptopropionyloxy)ethyl] isocyanurate (3TI), pentaerythritol tetrakis(3-mercaptopropionate) (PETMP), or combinations thereof.

20. The polymer composition of claim 19, wherein the pendant allyl ether group is a reaction product of trimethylolpropane allyl ether (TMPAE).

* * * * *